United States Patent
Takahei et al.

(10) Patent No.: US 11,630,437 B2
(45) Date of Patent: Apr. 18, 2023

(54) NUMERICAL CONTROL SYSTEM AND MOTOR DRIVE CONTROLLER

(71) Applicants: Mitsubishi Electric Corporation, Tokyo (JP); NATIONAL UNIVERSITY CORPORATION NAGOYA UNIVERSITY, Aichi (JP)

(72) Inventors: Kazuki Takahei, Tokyo (JP); Ryosuke Ikeda, Tokyo (JP); Norikazu Suzuki, Aichi (JP); Shoya Ohno, Aichi (JP)

(73) Assignees: MITSUBISHI ELECTRIC CORPORATION, Tokyo (JP); NATIONAL UNIVERSITY CORPORATION NAGOYA UNIVERSITY, Nagoya (JP)

( * ) Notice: Subject to any disclaimer, the term of this patent is extended or adjusted under 35 U.S.C. 154(b) by 517 days.

(21) Appl. No.: 16/638,751

(22) PCT Filed: Aug. 30, 2017

(86) PCT No.: PCT/JP2017/031261
§ 371 (c)(1),
(2) Date: Feb. 13, 2020

(87) PCT Pub. No.: WO2019/043852
PCT Pub. Date: Mar. 7, 2019

(65) Prior Publication Data
US 2020/0333764 A1 Oct. 22, 2020

(51) Int. Cl.
*G05B 19/408* (2006.01)
(52) U.S. Cl.
CPC ............... *G05B 19/4086* (2013.01); *G05B 2219/33263* (2013.01); *G05B 2219/42156* (2013.01); *G05B 2219/45044* (2013.01)

(58) Field of Classification Search
None
See application file for complete search history.

(56) References Cited

U.S. PATENT DOCUMENTS

2004/0128030 A1* 7/2004 Nagata .................. B25J 9/1633
700/245
2004/0258495 A1* 12/2004 Kakino ................. G05B 19/00
409/132

FOREIGN PATENT DOCUMENTS

JP 2007-233917 A 9/2007
JP 2013-061884 A 4/2013

OTHER PUBLICATIONS

International Search Report and Written Opinion dated Nov. 21, 2017 for PCT/JP2017/031261 filed on Aug. 30, 2017, 8 pages including English Translation of the International Search Report.
(Continued)

*Primary Examiner* — Sean Shechtman
(74) *Attorney, Agent, or Firm* — Xsensus LLP

(57) ABSTRACT

A numerical control system according to the present invention controls machine drive systems included in a machine tool that performs machining using a tool, according to a numerical control program, and includes a coordinate transformation unit that acquires a disturbance force or a disturbance torque applied to each machine drive system, and coordinate-transforms the disturbance force or the disturbance torque into a tool reference coordinate system for output, and an identification unit that calculates cutting process parameters that determine characteristics of a cutting process model and dynamic characteristic parameters that determine characteristics of a dynamics model of the machine tool, using the disturbance force or the disturbance torque output from the coordinate transformation unit, states of the machine drive systems, predetermined equation models, and cutting conditions. The equation models define
(Continued)

relationships between the cutting process parameters, the dynamic characteristic parameters, and the disturbance force or the disturbance torque.

16 Claims, 18 Drawing Sheets

(56) References Cited

OTHER PUBLICATIONS

Ikeda, R., et al., "Intelligent process identification by utilizing disturbance force estimation and cutting simulation in milling process," Proceedings of JSPE Semestrial Meeting, 2017, pp. 919-920, (See English Abstract).

* cited by examiner

NUMERICAL CONTROL SYSTEM AND MOTOR DRIVE CONTROLLER

CROSS-REFERENCE TO RELATED APPLICATIONS

The present application is based on PCT filing PCT/JP2017/031261, filed Aug. 30, 2017, the entire contents of which are incorporated herein by reference.

FIELD

The present invention relates to a numerical control system and a motor drive controller for controlling a machine tool.

BACKGROUND

A machine tool is a machining apparatus for removal machining that is machining to remove unnecessary portions from a workpiece by applying force or energy to the workpiece using a tool. In particular, in cutting, which is one type of removal machining, a tooth edge of a tool is brought into contact with a workpiece at a high cutting speed, causing shear fracture on a workpiece surface, and scraping off an unnecessary portion of the workpiece.

Cutting is a physical phenomenon in which a cutting process and mechanical dynamics influence each other. Thus, it is desirable to manage both simultaneously to manage a machining state. Here, a cutting process represents a series of steps in which a tool tooth edge enters a workpiece, forming a machined surface while producing chips. Mechanical dynamics represent the behavior of structures constituting a machine when the mechanical structures are vibrated by a vibration source inside or outside the machine tool. In general, cutting is a phenomenon in which various physical phenomena including the above-described cutting process and mechanical dynamics complexly influence each other. Thus, integrated analysis thereof is considered to be difficult. Therefore, in production sites, objects to be evaluated are limited to achieve machining management depending on the purpose.

For example, a method is used which evaluates a position deviation of a tool produced with respect to an ideal trajectory by measuring machined workpiece dimensions, and adjusts depth or width of cutting so that the workpiece falls within desired accuracy. In another example, a method is used which evaluates the wear width of a tool tooth edge after machining for a predetermined time or by a predetermined distance, to search for a cutting speed that allows the tool to have extended life while maintaining machining quality. In still another example, a method is used which acquires detection signals from a force sensor added to a machine, to determine a spindle drive system rotation speed or a feed rate at which cutting load does not become excessive. In still another example, a method is used which observes the shape or discharged direction of chips produced during machining, to adjust cutting speed and cutting amount.

However, by the evaluation methods of the above methods which perform evaluation using results measured during non-machining, evaluated objects are not in the same state as those during machining. Thus, the measurement results do not represent an actual machining. For a cutting process in which a plurality of physical phenomena influence each other, it is desirable to analyze and evaluate a machining state during machining, i.e. in-process. As a method of managing a machining state in-process, Patent Literature 1 proposes the following method.

In the method described in Patent Literature 1, machining performed by a machine tool at which a force sensor is installed is simulated, a simulated cutting force is compared with a measured value of the force sensor, and cutting process information for calculating a cutting force by simulation is corrected to estimate a final cutting force. This method can calculate a value reflecting a machining state because the cutting process information is updated, using a cutting force obtained during actual machining.

CITATION LIST

Patent Literature

Patent Literature 1: Japanese Patent Application Laid-open No. 2013-061884

SUMMARY

Technical Problem

However, in the method described in Patent Literature 1, only the cutting process information is calculated, using dynamic characteristic information on a tool stored in advance. Thus, there is a problem in that if the dynamic rigidity of a structure in the machine has changed during machining, displacement cannot be calculated correctly. It is known that generally, the dynamic rigidity of a spindle drive system changes due to heat generation in the spindle drive system, and the dynamic rigidity of a workpiece changes due to a decrease in the workpiece mass caused by cutting. The method described in Patent Literature 1 that does not take mechanical dynamics into account thus has a problem in that it cannot accurately identify a cutting process and mechanical dynamics that change successively during machining.

The present invention has been made in view of the above. It is an object of the present invention to provide a numerical control system that can accurately identify a cutting process and mechanical dynamics.

Solution to Problem

A numerical control system according to an aspect of the present invention is a numerical control system that controls machine drive system included in a machine tool that performs machining using a tool, according to a numerical control program, and includes a coordinate transformation unit that acquires a disturbance force or a disturbance torque applied to each of the machine drive systems, and coordinate-transforms the disturbance force or the disturbance torque into a tool reference coordinate system for output. The numerical control system further includes an identification unit that calculates cutting process parameters that determine characteristics of a cutting process model and dynamic characteristic parameters that determine characteristics of a dynamics model of the machine tool, using the disturbance force or the disturbance torque output from the coordinate transformation unit, states of the machine drive systems, predetermined equation models, and cutting conditions. The equation models define relationships between the cutting process parameters, the dynamic characteristic parameters, and the disturbance force or the disturbance torque.

Advantageous Effects of Invention

The numerical control system according to the present invention has an advantage of being able to accurately identify a cutting process and mechanical dynamics.

DESCRIPTION OF EMBODIMENTS

Hereinafter, a numerical control system and a motor drive controller according to embodiments of the present invention will be described in detail with reference to the drawings. The embodiments are not intended to limit the invention.

First Embodiment

Figure 1:
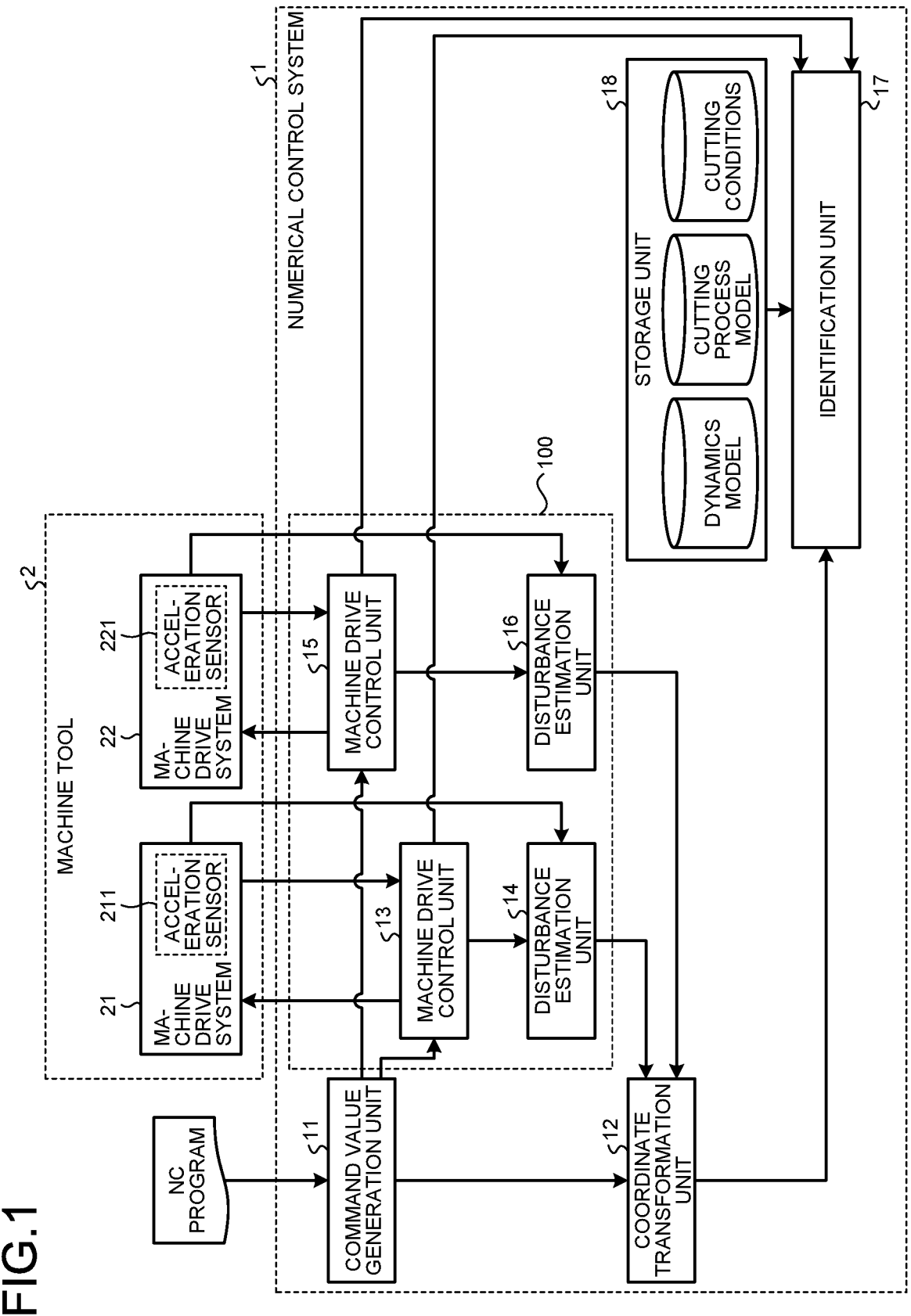
FIG. 1 is a block diagram illustrating a configuration example of a numerical control system according to a first embodiment.

FIG. 1 is a block diagram illustrating a configuration example of a numerical control system according to a first embodiment of the present invention. A numerical control system 1 of the first embodiment controls a machine tool 2.

The machine tool 2 includes a machine drive system 21 and a machine drive system 22. The machine drive system 21 and the machine drive system 22 each include a motor and one or more structures connected to the motor. The machine drive system 22 is a spindle drive system that imparts rotational motion to a tool. The machine drive system 21 is a feed drive system that gives a position to the tool. The machine drive system 22 and the machine drive system 21 are controlled in synchronization. The machine drive system 21 as the feed drive system includes, for example, a servomotor, a coupling, a ball screw, and a table. The machine drive system 22 as the spindle drive system includes, for example, a spindle motor, a gear, a shaft, and a tooling system. The machine tool 2 rotates a tool attached to the machine drive system 22 as the spindle drive system, to perform cutting on a workpiece fixed on the table of the machine drive system 21 as the feed drive system. The machine drive system 21 and the machine drive system 22 are an example of machine drive systems included in the machine tool 2 that performs machining using a tool. The configurations of the machine drive system 21 and the machine drive system 22 are not limited to the above-described examples. Although FIG. 1 illustrates one machine drive system 21 as a feed drive system, the number of feed drive systems may be one or more.

The servomotor of the machine drive system 21 and the spindle motor of the machine drive system 22 each include a rotary encoder, and output an encoder signal that is a signal detected by the rotary encoder to the numerical control system 1. The machine drive system 21 detects a motor current applied to the servomotor, and outputs a detection result as a motor current signal to the numerical control system 1. The machine drive system 22 detects a motor current applied to the spindle motor, and outputs a detection result as a motor current signal to the numerical control system 1.

The numerical control system 1 controls the machine drive system 21 and the machine drive system 22 according to a Numerical Control (NC) program provided from outside or held inside.

The NC program includes a position command of a relative tool position or a feed drive system in a predetermined coordinate system, a spindle drive system rotation speed command, and a feed rate command. The above-described coordinate system used in the NC program is referred to as an NC program coordinate system. The NC program coordinate system is a coordinate system fixed to a workpiece, for example.

As illustrated in FIG. 1, the machine drive system 21 is provided with an acceleration sensor 211, and the machine drive system 22 is provided with an acceleration sensor 221. The acceleration sensor 211 detects acceleration in the machine drive system 21 in a linear direction or a rotation direction, and outputs a detection result as an acceleration sensor signal to the numerical control system 1. The acceleration sensor 221 detects acceleration in the machine drive system 22 in a linear direction or a rotation direction, and outputs a detection result as an acceleration sensor signal to the numerical control system 1. The acceleration sensor 211 and the acceleration sensor 221 may be included in the numerical control system 1. The acceleration sensor 211 and the acceleration sensor 221 are an example of sensors that detect the speed or acceleration of the machine drive systems 21 and 22.

As illustrated in FIG. 1, the numerical control system 1 includes a command value generation unit 11, a coordinate transformation unit 12, machine drive control units 13 and 15, disturbance estimation units 14 and 16, an identification unit 17, and a storage unit 18. The storage unit 18 stores a dynamics model, a cutting process model, and cutting conditions. The dynamics model, the cutting process model, and the cutting conditions will be described later. The machine drive control units 13 and 15 and the disturbance estimation units 14 and 16 constitute a motor drive controller 100.

Figure 2:
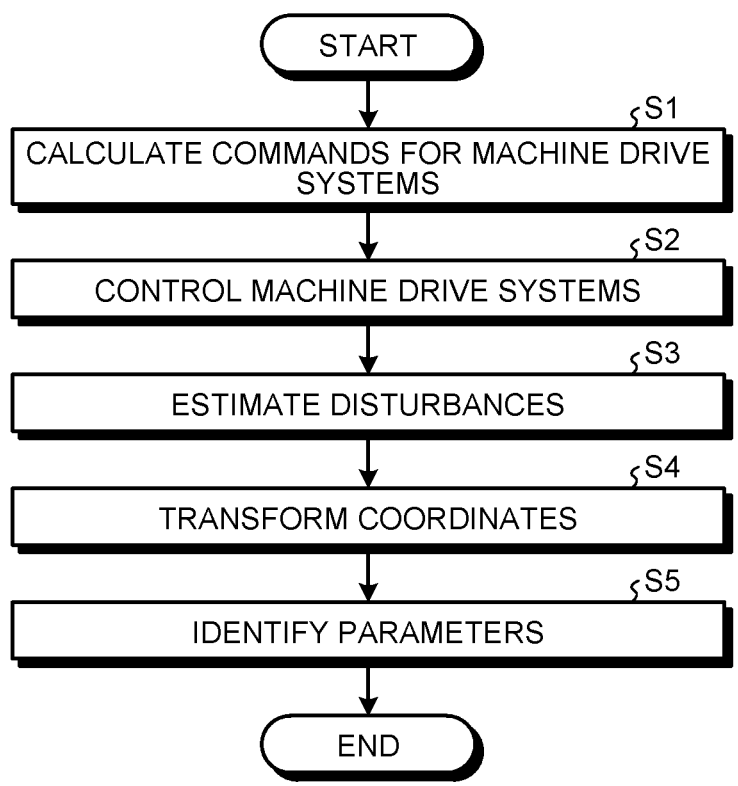
FIG. 2 is a flowchart illustrating an example of an operation procedure in the numerical control system of the first embodiment.

FIG. 2 is a flowchart illustrating an example of an operation procedure in the numerical control system 1 of the first embodiment. The operation of the numerical control system 1 of the first embodiment will be described with reference to FIGS. 1 and 2.

The command value generation unit 11 analyzes commands described in the NC program, and calculates drive commands for the machine drive systems (step S1). The command value generation unit 11 outputs the calculated drive commands to the machine drive control units 13 and 15. Further, the command value generation unit 11 outputs, to the coordinate transformation unit 12, setting information on the NC program coordinate system, the relative tool position and the tool rotation angle in the coordinate system, and the drive commands for the machine drive systems. The setting information on the NC program coordinate system, and the relative tool position and the tool rotation angle in the coordinate system are described in the NC program.

The machine drive control units 13 and 15 control the machine drive systems according to the drive commands calculated by the command value generation unit 11 (step S2). Specifically, the machine drive control unit 13 controls the motor current so that the encoder signal output from the rotary encoder of the servomotor of the machine drive system 21 follows the drive command representing a target value. The machine drive control unit 15 controls the motor current so that the encoder signal output from the rotary encoder of the spindle motor of the machine drive system 22 follows the drive command representing a target value. Further, each of the machine drive control units 13 and 15 outputs, to the identification unit 17 described later, a machine drive system state that is information including a position command, position feedback, a velocity command, and velocity feedback of corresponding one of the machine drive systems. Operations in the machine drive control units 13 and 15 are general operations in accordance with the drive commands, and thus will not be described in detail.

The disturbance estimation unit 14 and the disturbance estimation unit 16 estimate disturbances in the machine drive system 21 and the machine drive system 22, respectively (step S3). Specifically, the disturbance estimation unit 14 estimates and outputs a disturbance force applied to the machine drive system 21 as a disturbance force acting on a feed drive system, using the encoder signal and the motor current signal output from the machine drive system 21, and the acceleration sensor signal output from the acceleration sensor 211. Specifically, the disturbance force is estimated, regarding the feed drive system as a single inertia drive system, using the following formula (1).

$$F_{d1} = K_1 I_1 - Ma \qquad [\text{Formula 1}]$$

$F_{d1}$: disturbance force acting on a machine drive system,
$K_1$: torque constant, $I_1$: motor current,
M: mass of machine drive system, a: acceleration A method of estimating the disturbance force acting on a feed drive system is not limited to the above-described example. For example, the disturbance estimation unit 14 may calculate, as an estimated disturbance force, the result of formula (1) from which a viscous frictional force proportional to the speed of the machine drive system is subtracted.

The disturbance estimation unit 16 estimates and outputs a disturbance force applied to the spindle drive system as a disturbance force acting on the spindle drive system, using the encoder signal and the motor current signal output from the machine drive system 22, and the acceleration sensor signal output from the acceleration sensor 221. The disturbance estimation unit 16 estimates a disturbance force applied to the machine drive system 22 using a detection result detected by a sensor that detects the velocity or acceleration of the machine drive system 22. Specifically, the acceleration sensor signal is converted into angular acceleration, and the disturbance force acting on the spindle drive system is estimated using the following formula (2) with regarding the spindle drive system as a single inertia drive system.

[Formula 2]

$$F_{d2} = \frac{K_2 I_2 - J\dot{\omega}}{r}$$

$F_{d2}$: disturbance force acting on a spindle drive system,
$K_2$: torque constant, $I_2$: motor current,
J: main spindle axial inertia,
$\dot{\omega}$: angular acceleration, r: tool radius A method of estimating the disturbance force acting on the spindle drive system is not limited to the above-described example. For example, the disturbance estimation unit 16 may calculate, as an estimated disturbance force, the result of formula (2) from which a viscous frictional force proportional to the angular velocity of the machine drive system is subtracted. The disturbance estimation unit 16 may calculate and output an estimated disturbance torque instead of the estimated disturbance force.

Returning to the description of FIG. 2, next, the coordinate transformation unit 12 coordinate-transforms the disturbance force acting on the feed drive system calculated by the disturbance estimation unit 14 and the disturbance force acting on the spindle drive system calculated by the disturbance estimation unit 16, based on the setting information on the NC program coordinate system and the relative tool position and the tool rotation angle in the NC program coordinate system output from the command value generation unit 11, into a tool reference coordinate system for output (step S4). That is, the coordinate transformation unit 12 acquires the disturbance forces or disturbance torques applied to the machine drive systems 21 and 22, and coordinate-transforms the disturbance forces or disturbance torques into the tool reference coordinate system for output. In the first embodiment, the coordinate transformation unit 12 acquires disturbance forces or disturbance force vectors of the machine drive systems from the disturbance estimation units 14 and 16.

Here, the tool reference coordinate system is a coordinate system including a tool axis direction and other two directions in a plane perpendicular to the tool axis direction, and, for example, is a coordinate system with reference to the tool in which the tool axis direction is aligned with the Z axis, a tool traveling direction in a plane perpendicular to the tool axis direction is the X axis, and a direction perpendicular to the X axis and the Z axis is the Y axis. The tool reference coordinate system is a coordinate system that is translated with the translation of the tool, but is a coordinate system that does not consider rotation with the rotation of the tool. The tool reference coordinate system is not limited to the above-described example, and may be any coordinate system including a tool axis direction and other two directions in a plane perpendicular to the tool axis direction. The disturbance force acting on the spindle drive system is a quantity that varies in force direction depending on the tool rotation angle, unlike the disturbance force acting on the feed drive system. Thus, the coordinate transformation of the spindle drive system disturbance force is executed on each tool rotation angle.

Figure 3:
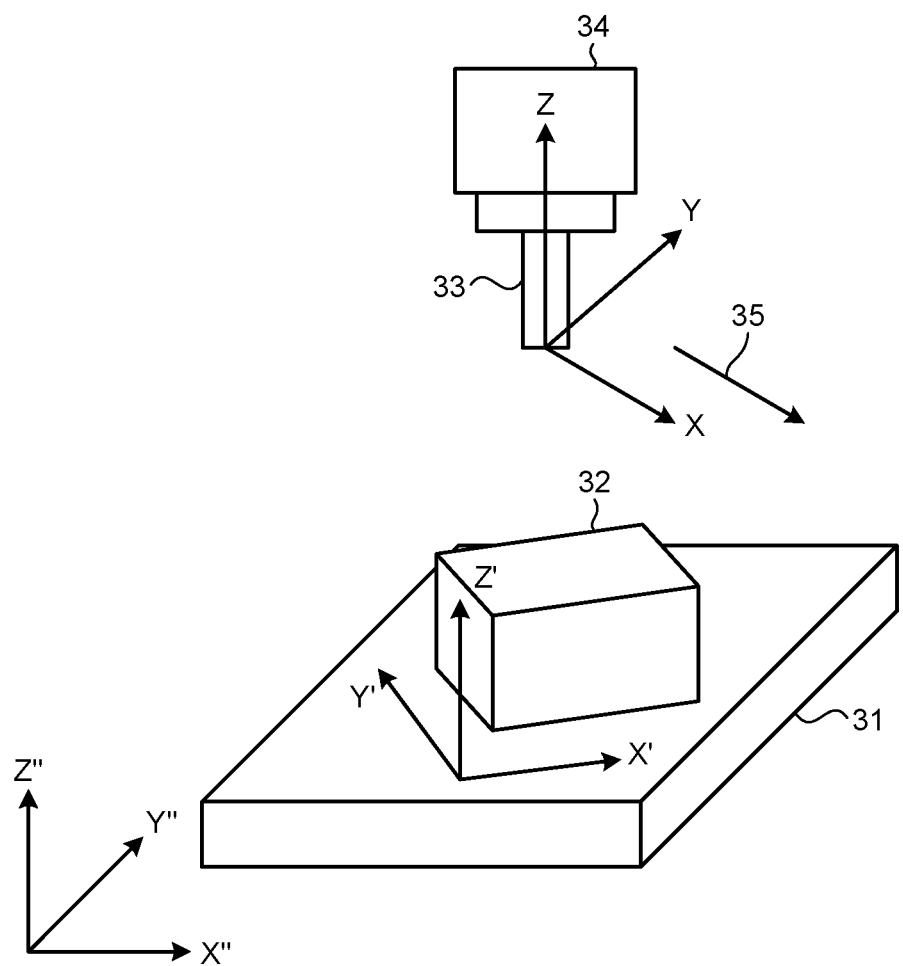
FIG. 3 is a diagram illustrating relationships between coordinate systems in the first embodiment.

Specific processing in the coordinate transformation unit 12 will be described with reference to FIG. 3. FIG. 3 is a diagram illustrating the relationships between coordinate systems in the first embodiment. In the example illustrated in FIG. 3, a workpiece 32 is placed on a table 31 that constitutes the machine drive system 21, and a tooling system 34 that constitutes the machine drive system 22 holds a tool 33. The table 31 is driven by the servomotor (not illustrated), and the tooling system 34 is driven by the spindle motor (not illustrated). A coordinate system X-Y-Z is the tool reference coordinate system, a coordinate system X'-Y'-Z' is the NC program coordinate system, and a coordinate system X"-Y"-Z" is a machine coordinate system. A direction 35 indicates a direction of relative displacement of the front end of the workpiece 32 with respect to the table 31.

The coordinate transformation unit 12 sets the tool reference coordinate system X-Y-Z, using the setting information on the NC program coordinate system and relative tool position information. Further, the coordinate transformation unit 12 coordinate-transforms the estimated disturbance force acting on the feed drive system calculated by the disturbance estimation unit 14 into an estimated disturbance force in the tool reference coordinate system X-Y-Z, and outputs it to the identification unit 17. The coordinate transformation unit 12 may coordinate-transforms the estimated disturbance force of the spindle drive system calculated by the disturbance estimation unit 16 into an estimated disturbance force in the tool reference coordinate system, and output it to the identification unit 17.

Because the estimated disturbance force acting on the feed drive system and the estimated disturbance force acting on the spindle drive system each include components in the X direction and the Y direction in the tool reference coordinate system, the coordinate transformation unit 12 can determine an estimated disturbance force to be output to the identification unit 17 by performing the following processing on the X direction and the Y direction. For example, the coordinate transformation unit 12 takes the mean values of the components in the X direction and the Y direction, and adds a Z axis component of the disturbance force acting on the feed drive system to the mean values, to output them as an estimated disturbance force to the identification unit 17. As another example, a machine drive system to be used for an estimated disturbance force may be set in advance for each machining path, and an estimated disturbance force corresponding to the machine drive system may be coordinate-transformed and output. As still another example, the mean values of the X-axis components and the Y-axis components of the disturbance force acting on the feed drive system and the disturbance force acting on the spindle drive system may be calculated, and the mean values may be used as an estimated disturbance force. As still another example, the coordinate transformation unit 12 may set in advance a determination lower limit and a determination upper limit on each of the X axis components and the Y axis components for the disturbance force acting on the feed drive system and the disturbance force acting on the spindle drive system, and use, as an estimated disturbance force, the X-axis component or the Y-axis component of the disturbance force acting on the feed drive system or the disturbance force acting on the spindle drive system that is higher than or equal to the corresponding determination lower limit and lower than or equal to the corresponding determination upper limit. When the acquired disturbance forces or disturbance torques include components in the same direction on tool reference coordinates, the coordinate transformation unit 12 may select a combination in which directions are independent from each other out of the acquired disturbance forces or disturbance torques. As still another example, the degree of reliability may be set for each machine drive system, and a machine drive system with a higher degree of reliability may be used for coordinate transformation. It is known that estimation accuracy of a multi-inertia drive system is generally lower than that of a single-inertia drive system. Therefore, for example, by setting the reciprocal of the number of inertial bodies constituting a machine drive system as the degree of reliability, a machine drive system with a simple structure can be preferentially used. As another example of a reliability degree setting method, by setting the degree of reliability of a machine drive system close to a machining part high, and setting the degree of reliability of a machine drive system far from the machining part low, the machine drive system susceptible to cutting force produced at the machining part can be preferentially used. As another example of a reliability degree setting method, by setting the degree of reliability of a machine drive system to a value higher than zero when the machine drive system is driving, and setting the degree of reliability of a machine drive system to zero when the machine drive system is at rest, the driving machine drive system can be preferentially used. The above reliability degree setting methods can also be used in combination. Reliability degree setting methods are not limited to those above.

Returning to the description of FIG. 2, the identification unit 17 calculates parameters such as dynamic characteristic parameters that determine the characteristics of the dynamics model and cutting process parameters that determine the characteristics of the cutting process model (step S5). Specifically, the identification unit 17 calculates dynamic characteristic parameters that determine the characteristics of the dynamics model and cutting process parameters that determine the characteristics of the cutting process model, using the estimated disturbance force or estimated disturbance torque output from the coordinate transformation unit 12, the machine drive system states output from the machine drive control units 13 and 15, and the cutting conditions, the dynamics model, and the cutting process model stored in the storage unit 18. Here, the dynamic characteristic parameters are parameters that determine the characteristics of the dynamics model to be described later, such as a damping coefficient, a natural frequency, a mass, and a vibration mode vector. The cutting process parameters are parameters that determine the characteristics of the cutting process model to be described later, such as a specific cutting resistance, an edge force, a tool eccentricity, and a tool wear width.

As the cutting conditions, information is set which includes a feedrate per tooth, a tool diameter, the number of tool teeth, a tool torsion angle, an axial depth of cutting, a radial depth of cutting, a workpiece material shape, and a cutting mode indicating up-cut or down-cut.

Figure 4:
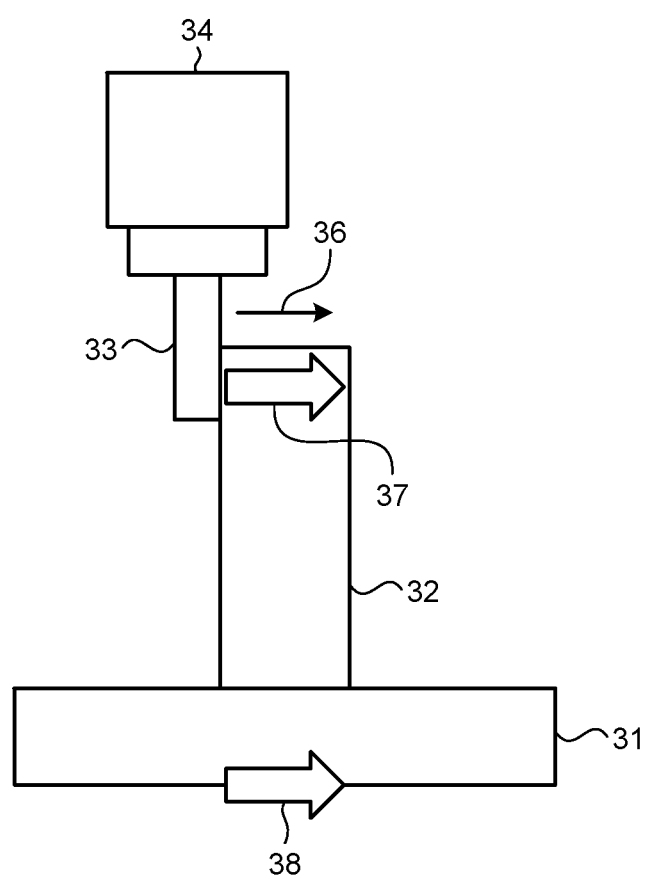
FIG. 4 is a schematic diagram illustrating a state where a disturbance force is transmitted to a table when a workpiece fixed to the table vibrates due to a cutting force in the first embodiment.

The dynamics model is a mathematical model that describes the dynamic characteristics of mechanical structures inside the machine tool 2. Hereinafter, an example of the dynamics model will be described. FIG. 4 is a schematic diagram illustrating a state where a disturbance force is transmitted to the table 31 when the workpiece 32 fixed to the table 31 vibrates due to a cutting force in the first embodiment. Like the example illustrated in FIG. 3, FIG. 4 is premised on a configuration example in which the workpiece 32 is placed on the table 31 of the machine drive system 21, and the tooling system 34 of the machine drive system 22 holds the tool 33. In FIG. 4, a relative displacement 36 indicates a relative displacement of the front end of the workpiece 32 in a vibration mode vector direction with respect to the table 31, a cutting force 37 indicates the cutting force in the workpiece 32, and a disturbance force 38 indicates the disturbance force transmitted to the table 31. The relationships between the cutting force 37, the disturbance force 38, and the relative displacement 36 at this time can be expressed by the following formula (3). The dynamics model represented in formula (3) is a mathematical model for calculating a disturbance force transmitted to a machine drive system through a mechanical structure including a tool or a workpiece when a cutting force is produced, and calculating a position deviation produced at each machine drive system through the mechanical structure when the cutting force is produced.

$$f_c = m_r \ddot{x} + c_r \dot{x} + k_r x$$

$$f_d = c_r \dot{x} + k_r x \qquad \text{[Formula 3]}$$

$f_c$: cutting force, $f_d$: disturbance force,
$m_r$: equivalent mass, $c_r$: equivalent damping coefficient,
$k_r$: equivalent spring constant,
x: relative displacement of cutting part of workpiece in vibration mode vector direction with respect to table The dynamics model illustrated in formula (3) is a model in which the workpiece 32 on the table 31 is described as a one-degree-of-freedom vibration system, but the dynamics model is not limited to the above example. For example, the dynamics model may be described as a multi-degree-of-freedom vibration system including a fixing portion for fixing the workpiece 32 and the table 31. Further, a dynamics model on the tool-side structure including the tool 33, the tooling system 34, and the spindle motor may be set. Furthermore, a dynamics model may be set as a vibration system in which the workpiece 32-side structure and the tool 33-side structure are combined.

The cutting process model is a mathematical model that describes a cutting process between the tool 33 and the workpiece 32. An example of the cutting process model is represented in the following formula (4).

$$f_c = K^c a h(\varphi(t)) \cdot g(\varphi(t)) \qquad \text{[Formula 4]}$$

$f_c$: cutting force, $K^c$: specific cutting resistance
a: axial depth of cutting, h: uncut chip thickness,
$\varphi$: tool rotation angle, t: time $$g(\varphi(t)) = \begin{cases} 1 & (\varphi_s \leq \varphi(t) \leq \varphi_f) \\ 0 & (\varphi(t) < \varphi_s, \varphi_f < \varphi(t)) \end{cases}$$

$\varphi_s$: tool engage angle, $\varphi_f$: tool disengage angle

Figure 5:
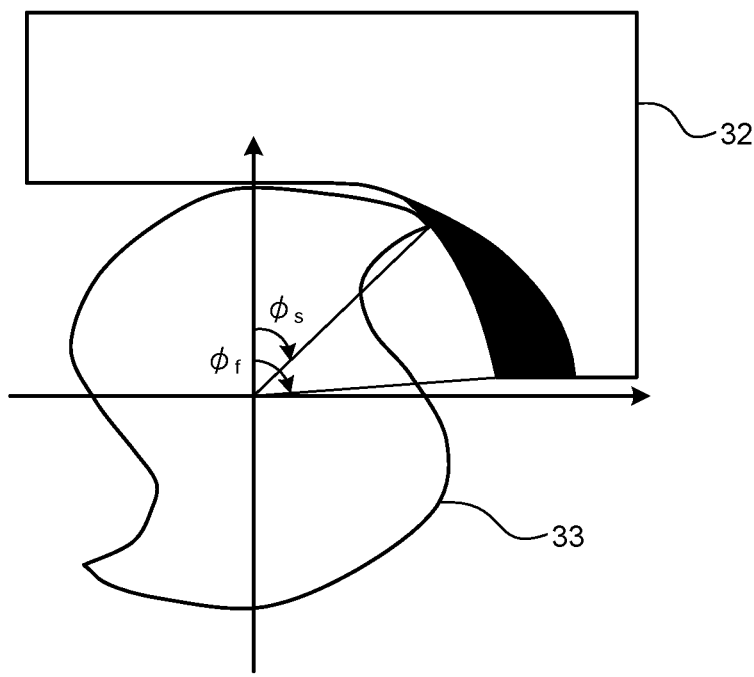
FIG. 5 is a diagram illustrating an example of a rotation angle of a tool with a tool tooth edge contacting the workpiece in the first embodiment.
Figure 6:
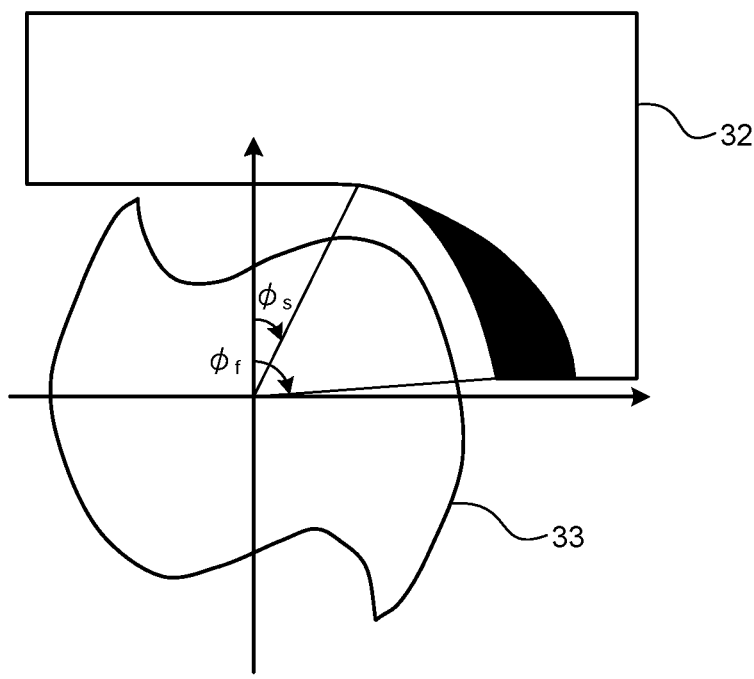
FIG. 6 is a diagram illustrating an example of a rotation angle of the tool with tool tooth edges not contacting the workpiece in the first embodiment.

The above formula (4) is a numerical formula for calculating a cutting force to be applied by the tool to the workpiece from an uncut chip thickness corresponding to a tool rotation angle at each time. Here, the uncut chip thickness refers to a thickness by which a tool tooth edge that is a tooth edge of the tool 33 cuts the workpiece 32 when passing through the workpiece 32. As illustrated in FIGS. 5 and 6, when a tool tooth edge is at an angle at which it contacts the workpiece 32, the cutting force is calculated to a value higher than or equal to zero, and when the tool tooth edge is at an angle at which it does not contact the workpiece 32, the cutting force is calculated to zero. FIG. 5 is a diagram illustrating an example of the rotation angle of the tool 33 at which a tool tooth edge contacts the workpiece 32. FIG. 6 is a diagram illustrating an example of the rotation angle of the tool 33 at which no tool tooth edges contact the workpiece 32. That is, it is determined whether a tooth edge contacts the workpiece 32 based on a position deviation at each rotation angle of the tool 33 or each time. When a tool tooth edge contacts the workpiece 32, the uncut chip thickness is calculated. When no tool tooth edges contact the workpiece 32, the uncut chip thickness is calculated to zero.

By performing the calculation illustrated in formula (4) on three directions: a tangential direction, a radial direction, and an axial direction of the tool, a cutting force in the three directions can be calculated. In the cutting process model, by multiplying a cutting force having components in the three directions by a rotation matrix corresponding to a tool rotation angle for coordinate transformation, the cutting force in the tool reference coordinate system is calculated. An example of the coordinate transformation is illustrated in formula (5).

$$\begin{bmatrix} F_x^c \\ F_y^c \\ F_z^c \end{bmatrix} = \begin{bmatrix} \cos\varphi(t) & \sin\varphi(t) & 0 \\ -\sin\varphi(t) & \cos\varphi(t) & 0 \\ 0 & 0 & 1 \end{bmatrix} \begin{bmatrix} F_t^c \\ F_r^c \\ F_a^c \end{bmatrix} \qquad \text{[Formula 5]}$$

$F_x^c$: cutting force in X-axis direction in tool reference coordinate system,
$F_y^c$: cutting force in Y-axis direction in tool reference coordinate system,
$F_z^c$: cutting force in Z-axis direction in tool reference coordinate system,
$F_t^c$: cutting force in tool tangential direction,
$F_r^c$: cutting force in tool radial direction,
$F_a^c$: cutting force in tool axial direction By performing the calculations represented in the above formulas (4) and (5) for each tool tooth edge, a final cutting force is calculated. The cutting process model illustrated in formula (4) is a mathematical model for calculating an uncut chip thickness, based on a tool rotation angle and a relative position between a tooth edge of a tool and a workpiece machined by the tool, and calculating a cutting force produced between the tool and the workpiece based on the uncut chip thickness. An uncut chip thickness in formula (4) can be calculated by formula (6) using a feedrate per tooth and a tool rotation angle.

$$h(\varphi(t))=c \sin \varphi(t) \qquad \text{[Formula 6]}$$

c: feedrate per tooth

As another example, an uncut chip thickness can also be calculated using formula (7).

$$h(\varphi(t))=c \sin \varphi(t)+\{v(\varphi,t)-w(\varphi,t)\}+\Delta r(\varphi,t,N_{tooth}) \qquad \text{[Formula 7]}$$

v: tool center displacement amount in tool radial direction,
w: previous machined surface displacement amount in tool radial direction,
T: cutting cycle, $\Delta r$: correction amount corresponding to tooth edge of a tool and tool rotation angle,
$N_{tooth}$: tooth number Formula (7) is a formula for calculating an uncut chip thickness obtained by adding, to formula (6), a variation calculated from the difference between a current tool displacement and a previous machined surface, and further adding a correction amount corresponding to each tool tooth edge. In the calculation illustrated in formula (7), an uncut chip thickness is corrected by the difference between the amount of displacement that has given influence on the machined surface shape among the amounts of displacement that have been produced at tool tooth edges one or more teeth before, and the amount of displacement that has been produced at the current tool tooth edge. That is, the uncut chip thickness is calculated based on the difference between a trajectory produced by the current tool tooth edge involved in cutting and a trajectory of a tool tooth edge that has given influence on the machined surface shape from among tool tooth edges one or more teeth before the current tool tooth edge. Here, the tool tooth edge one or more teeth before is a tool tooth edge that has been involved in cutting at a time before a time at which a tool tooth edge is being involved in cutting. For example, in a tool with two teeth, when a tool tooth edge currently cutting is a second tooth, a tool tooth edge one tooth before is a first tooth before rotation through 180 degrees, a tool tooth edge two teeth before is the second tooth before rotation through 360 degrees, and a tool tooth edge three teeth before is the first tooth before rotation through 540 degrees. When the tool is displaced during cutting and the tooth edges temporarily move away from the workpiece, the current tool tooth edge cuts not only a previous machined surface produced by a tool tooth edge one tooth before but also a previous machined surface produced by a tool tooth edge two or more teeth before.

Figure 7:
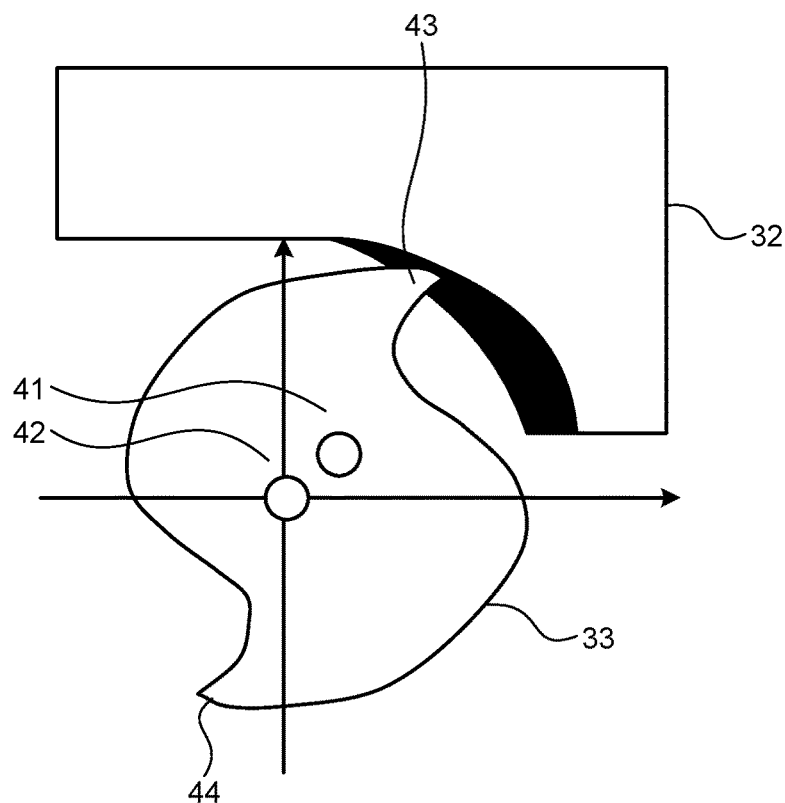
FIG. 7 is a diagram illustrating a state of cutting at a first tooth edge when a deviation is produced between the tool center and the spindle drive system center in the first embodiment.
Figure 8:
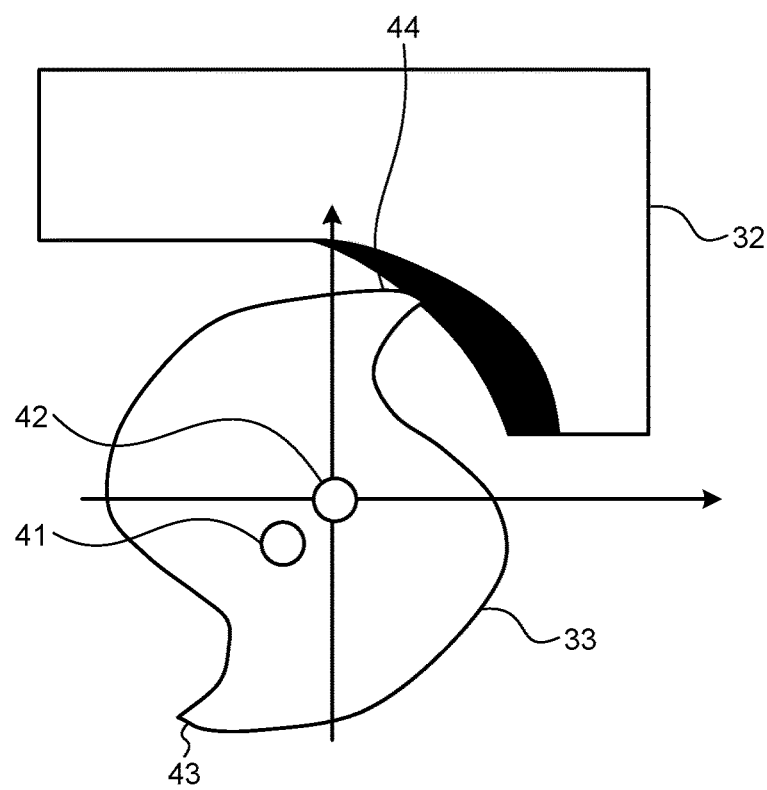
FIG. 8 is a diagram illustrating a state of cutting at a second tooth edge when a deviation is produced between the tool center and the spindle drive system center in the first embodiment.

Further, in the calculation illustrated in formula (7), an uncut chip thickness is corrected by a correction amount corresponding to a tool tooth edge number that is a number indicating a tool tooth edge and a tool rotation angle. Here, the correction amount is introduced to correct a change in uncut chip thickness due to cutting by tool tooth edges with different rotation radii. The following are examples where the correction amount needs to be introduced. For example, when wear or chipping of a tool occurs at a certain tooth edge of the tool, the radius of rotation of the tool tooth edge becomes shorter than that of the other tool tooth edge(s). Thus, a correction amount corresponding to the wear width or chipping width of the tool is added. As another example, when there is an error in tool tooth edge attachment in a replaceable tooth edge tool, a correction amount corresponding to the attachment error is added. As another example, when the spindle drive system center does not coincide with the tool center, that is, when there is a tool eccentricity, a correction amount corresponding to the tool eccentricity is added. The tool center is the center of the circumscribed circle of the tool 33. The tool eccentricity is the correction amount of an uncut chip thickness for each tool tooth edge by the amount of an increase or decrease in the radius of rotation of the tool tooth edge when an amount of misalignment is produced between the tool center and the spindle drive system center as illustrated in FIGS. 7 and 8. FIG. 7 is a diagram illustrating a state of cutting at the first tooth edge when an amount of misalignment is produced between the tool center and the spindle drive system center. FIG. 8 is a diagram illustrating a state of cutting at the second tooth edge when an amount of misalignment is produced between the tool center and the spindle drive system center. A first tooth edge 43 and a second tooth edge 44 are the tooth edges of the tool 33. In the example illustrated in FIGS. 7 and 8, there is a misalignment between the tool center and the spindle drive system center 42. In this case, it is necessary to correct an uncut chip thickness with respect to an uncut chip thickness when there is no misalignment. The tool eccentricity indicates the correction amount at this time. That is, the tool eccentricity corresponding to the rotation angle of the tool is added to or subtracted from the uncut chip thickness. Examples of correcting an uncut chip thickness with a correction amount are not limited to the above examples. The correction amount may be changed appropriately according to a process occurring at a tooth edge.

The cutting process model is not limited to formula (4). For example, using formula (4), the value of the specific cutting resistance when the cutting speed is a high speed that is higher than or equal to a threshold may be changed from that when the cutting speed is a low speed that is lower than the threshold. Further, a model in which an edge force component is added as a constant term to the right side of formula (4) may be used. Furthermore, a model in which a process damping force is added to the right side of formula (4) may be used. Here, the process damping force is a force produced by a flank face of a tool tooth edge contacting a workpiece. As another example, a cutting process model for a tool with a torsion angle may be used. Specifically, a model may be used which divides a tool into tool segments of a small thickness in an axial direction, calculates a cutting force at each small-thickness tool segment, and adds up the cutting forces in the tool axis direction to calculate a final cutting force. As still another example, a model that calculates an uncut chip thickness and a cutting force by finite element analysis may be used.

The following describes processing to identify an equivalent damping coefficient and an equivalent natural frequency as dynamic characteristic parameters, and identify a specific cutting resistance as a cutting process parameter when the dynamics model is formula (3) and the cutting process model is formulas (4) and (6). The dynamics model can be expressed in a form represented in the following formula (8) by deformation and time differentiation of formula (3).

$$\ddot{f}_d=2\zeta\omega_n(\dot{f}_c-\dot{f}_d)+\omega_n^2(f_c-f_d) \qquad \text{[Formula 8]}$$

$\zeta$: equivalent damping coefficient,
$\omega_n$: equivalent natural frequency By substituting formula (4) that is the cutting process model into formula (8) above, formula (9) below is obtained.

$$\ddot{f}_d = 2\zeta\omega_n\left(K^c a\left(\dot{h}(\varphi(t))g(\varphi(t)) + h(\varphi(t))\dot{g}(\varphi(t))\right) - \dot{f}_d\right) + \\ \omega_n^2(K^c ah(\varphi(t))g(\varphi(t)) - f_d) \qquad \text{[Formula 9]}$$

-continued $$\bar{g}(\varphi(t)) = \begin{cases} 1 & (\varphi = \varphi_s, \varphi_f) \\ 0 & (\text{otherwise}) \end{cases}$$

Further, when the right side of formula (9) is expressed by separating it into known numbers and unknown numbers, formula (10) is obtained.

$$\ddot{f}_d = \begin{bmatrix} a(\dot{h}(\varphi(t))g(\varphi(t)) + h(\varphi(t))\bar{g}(\varphi(t))) - \\ \dot{f}_d \quad ah(\varphi(t))g(\varphi(t)) - f_d \end{bmatrix} \begin{bmatrix} 2\varsigma\omega_n K^c \\ 2\varsigma\omega_n \\ \omega_n^2 K^c \\ \omega_n^2 \end{bmatrix}$$ [Formula 10]

Formula (10) is an equation model for calculating a second derivative of a disturbance force when the dynamic characteristic parameters and the cutting process parameters are provided. The identification unit 17 substitutes the estimated disturbance force transformed into the tool reference coordinate system by the coordinate transformation unit 12 into formula (10) to calculate the dynamic characteristic parameters and the cutting process parameters satisfying formula (10). As an example, by arranging as many formulas (10) as n (n is an integer of one or more) points of time, they can be expressed in a matrix form of formula (11). The identification unit 17 can calculate the dynamic characteristic parameters and the cutting process parameters by applying the least square method to formula (11).

$$\begin{bmatrix} \ddot{f}_{d,1} \\ \vdots \\ \ddot{f}_{d,n} \end{bmatrix} = \begin{bmatrix} a(\dot{h}_1 g_1 + h_1 \bar{g}_1) & -\dot{f}_{d,1} & ah_1 g_1 & -f_{d,1} \\ \vdots & \vdots & \vdots & \vdots \\ a(\dot{h}_n g_n + h_n \bar{g}_n) & -\dot{f}_{d,n} & ah_n g_n & -f_{d,n} \end{bmatrix}$$ [Formula 11]

$$\begin{bmatrix} 2\varsigma\omega_n K^c \\ 2\varsigma\omega_n \\ \omega_n^2 K^c \\ \omega_n^2 \end{bmatrix}$$

The above has described a method of deriving formula (10) and formula (11) from formula (9), and calculating the dynamic characteristic parameters and the cutting process parameters based on formula (10) or formula (11). Instead of formula (9), formula (12) may be used to perform the same calculation. In formula (12), a cutting determination function $g(\varphi(t))$ in formula (9) is replaced with a differentiable function $\delta(\varphi(t))$. $\delta(\varphi(t))$ may be any differentiable function that can approximate the cutting determination function $g(\varphi(t))$, and is not limited to the form shown below.

$$\ddot{f}_d = 2\varsigma\omega_n(K^c a(\dot{h}(\varphi(t))\delta(\varphi(t)) + h(\varphi(t))\dot{\delta}(\varphi(t))) - \dot{f}_d) +$$ [Formula 12]

$$\omega_n^2(K^c ah(\varphi(t))\delta(\varphi(t)) - f_d)$$

$$\delta(\varphi(t)) = \varsigma(\varphi(t), \varphi_s) - \varsigma(\varphi(t), \varphi_f)$$

$$\varsigma(x, y) = \frac{1}{1 + e^{-b(x-y)}}$$

As another example, by multiplying both sides of formula (10) or formula (11) by a smoothing window function, the dynamic characteristic parameters and the cutting process parameters can be calculated without being affected by differential errors.

As still another example, the identification unit 17 may perform a repeat operation using a search algorithm to search for the dynamic characteristic parameters and the cutting process parameters from formula (10) or formula (11). The calculation of the dynamic characteristic parameters and the cutting process parameters in the identification unit 17 is not limited to the operation using formula (10) and formula (11). By setting in advance an equation model of the dynamic characteristic parameters, the cutting process parameters, and the disturbance force or disturbance torque according to the forms of the dynamics model and the cutting process model, the dynamic characteristic parameters and the cutting process parameters can be calculated from the equation model and the estimated disturbance force or disturbance torque.

Further, identifiable parameters are not limited to the equivalent damping coefficient, the equivalent natural frequency, and the specific cutting resistance. For example, by configuring a dynamics model that includes a vibration mode vector in the dynamic characteristic parameters, and setting an equation model of the dynamic characteristic parameters, the cutting process parameters, and the disturbance force, the identification unit 17 can identify the dynamic characteristic parameters including the vibration mode vector. As another example, by configuring a cutting process model that includes a tool eccentricity in the cutting process parameters using formula (7), and setting an equation model of the dynamic characteristic parameters, the cutting process parameters, and the disturbance force, the identification unit 17 can identify the cutting process parameters.

As described above, the identification unit 17 calculates the cutting process parameters that determine the characteristics of the cutting process model and the dynamic characteristic parameters that determine the characteristics of the dynamics model of the machine tool 2, using the disturbance force output from the coordinate transformation unit 12, the predetermined equation models, and the cutting conditions. The above equation models define the relationships between the cutting process parameters, the dynamic characteristic parameters, and the disturbance force.

Next, a hardware configuration of the numerical control system 1 will be described. The command value generation unit 11, the coordinate transformation unit 12, at least part of the machine drive control units 13 and 15, the disturbance estimation units 14 and 16 and the identification unit 17 illustrated in FIG. 1 are implemented by a processing circuit. The machine drive control units 13 and 15 may include a circuit such as an inverter that generates motor current. The storage unit 18 is implemented by memory. The processing circuit may be a circuit including a processor, or may be dedicated hardware.

Figure 9:
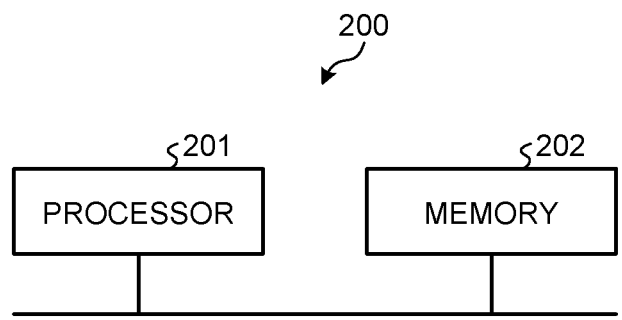
FIG. 9 is a diagram illustrating a configuration example of a processing circuit in the first embodiment.

When the processing circuit is a circuit including a processor, the processing circuit is, for example, a processing circuit of a configuration illustrated in FIG. 9. FIG. 9 is a diagram illustrating a configuration example of the processing circuit. A processing circuit 200 includes a processor 201 and memory 202. When the command value generation unit 11, the coordinate transformation unit 12, at least part of the machine drive control units 13 and 15, the disturbance estimation units 14 and 16, and the identification unit 17 are implemented by the processing circuit 200 illustrated in FIG. 9, these are implemented by the processor 201 reading and executing programs stored in the memory 202. That is, when the command value generation unit 11, the coordinate transformation unit 12, at least part of the machine drive control units 13 and 15, the disturbance estimation units 14 and 16, and the identification unit 17 are implemented by the processing circuit 200 illustrated in FIG. 9, the functions of them are implemented using programs that are software. The memory 202 is also used as a work area of the processor 201. The processor 201 is a Central Processing Unit (CPU) or the like. The memory 202 corresponds to nonvolatile or volatile semiconductor memory such as Random Access Memory (RAM), Read Only Memory (ROM), or a flash memory, or a magnetic disk or the like. The memory implementing the storage unit 18 may be the same as or different from the memory 202.

When the processing circuit implementing the command value generation unit 11, the coordinate transformation unit 12, at least part of the machine drive control units 13 and 15, the disturbance estimation units 14 and 16, and the identification unit 17 is dedicated hardware, the processing circuit is, for example, a Field Programmable Gate Array (FPGA), or an Application Specific Integrated Circuit (ASIC). The command value generation unit 11, the coordinate transformation unit 12, at least part of the machine drive control units 13 and 15, the disturbance estimation units 14 and 16, and the identification unit 17 may be implemented by a combination of a processing circuit including a processor and dedicated hardware. The command value generation unit 11, the coordinate transformation unit 12, at least part of the machine drive control units 13 and 15, the disturbance estimation units 14 and 16, and the identification unit 17 may be implemented by a plurality of processing circuits.

As described above, in the numerical control system 1 of the first embodiment, the coordinate transformation unit 12 coordinate-transforms estimated disturbance forces calculated by the disturbance estimation units 14 and 16 into the tool reference coordinate system, and the identification unit 17 identifies the dynamic characteristic parameters and the cutting process parameters from the equation models of the dynamic characteristic parameters, the cutting process parameters, and the disturbance force which is constructed based on the dynamics model, the cutting process model, and the cutting conditions. Thus, the numerical control system 1 has an advantage of being able to simultaneously calculate the dynamic characteristic parameters and the cutting process parameters that are cutting dominant parameters.

As a comparative example, consider an example of identifying cutting process parameters, based on detection results of force sensors provided to machine drive systems and a cutting process model. Detection results of the force sensors are results of detection of forces caused by a cutting force transmitted through mechanical structures, i.e. disturbance forces. Thus, the comparative example does not consider that a cutting force is transmitted as disturbance forces by mechanical dynamics. Therefore, the comparative example cannot identify accurate cutting process parameters. By contrast, in the first embodiment, the disturbance estimation units 14 and 16 estimate disturbance forces, and the identification unit 17 identifies the dynamic characteristic parameters and the cutting process parameters from the equation models of the dynamic characteristic parameters, the cutting process parameters, and the disturbance force which is constructed based on the dynamics model, the cutting process model, and the cutting conditions. Therefore, the first embodiment can identify the cutting process parameters more accurately than the comparative example.

In the first embodiment, acceleration sensors are provided to all machine drive systems including a spindle drive system and a feed drive system. However, the number of machine drive systems at which acceleration sensors are installed is not limited to the total number of machine drive systems. For example, acceleration sensors may be provided to three linear feed drive systems without providing an acceleration sensor to a spindle drive system, and a disturbance force vector may be calculated from results of detection by the acceleration sensors of the three linear feed drive systems. Alternatively, acceleration sensors may be provided to two linear feed drive systems without providing an acceleration sensor to a spindle drive system, and a two-dimensional disturbance force vector on a plane formed by the feed drive systems may be calculated from results of detection by the acceleration sensors to estimate dynamic characteristic parameters and cutting process parameters on the plane. Alternatively, a two-dimensional disturbance force vector on a plane perpendicular to a spindle drive system may be calculated from a result of detection by an acceleration sensor provided to the spindle drive system, and a disturbance force in the direction of a feed drive system parallel to the spindle drive system may be added thereto from a detection result of an acceleration sensor provided to the feed drive system, to calculate a three-dimensional disturbance force vector.

Further, the first embodiment has described a configuration for a machine tool having three linear feed drive systems and a spindle drive system, but the present invention is not limited to machine tools of this shaft configuration. For example, when a machine tool includes one or more rotating feed drive systems in addition to three linear feed drive systems and a spindle drive system, effects equivalent to those of the first embodiment can be achieved by the following configuration. Specifically, the command value generation unit 11 outputs a tool relative attitude in the NC program coordinate system to the coordinate transformation unit 12, and the coordinate transformation unit 12 coordinate-transforms a disturbance force acting on the feed drive system and a disturbance force acting on the spindle drive system into the tool reference coordinate system, taking the relative attitude of the tool into account, so that an estimated disturbance force vector can be calculated as in the first embodiment.

Furthermore, in the first embodiment, acceleration sensors are used as means for detecting the acceleration of machine drive systems, but physical quantities to be detected are not limited to acceleration. Sensors that directly detect velocity such as velocity sensors, gyro sensors, or laser Doppler meters may be used. That is, using sensors that can detect a physical quantity obtained by first or higher order time differentiation of the amount of displacement does not depart from the gist of the present invention.

Moreover, the numerical control system 1 described in the first embodiment may be composed of a plurality of devices. For example, the motor drive controller 100 including the machine drive control units 13 and 15 and the disturbance estimation units 14 and 16, and the other components of the numerical control system 1 may be formed as separate devices. The numerical control system 1 may consist of a numerical control device including the command value generation unit 11, the machine drive control units 13 and 15, the disturbance estimation units 14 and 16, and the coordinate transformation unit 12, and an industrial computer including the identification unit 17 and the storage unit 18. The industrial computer may be installed in the vicinity of the machine tool 2, or may be installed in a place away from the machine tool 2. The industrial computer may be connected to a plurality of machine tools 2. The industrial computer may be connected to the outside through a public line such as a wired or wireless Internet connection. When the numerical control system 1 consists of a plurality of devices, the command value generation unit 11, the coordinate transformation unit 12, at least part of the machine drive control units 13 and 15, the disturbance estimation units 14 and 16, and the identification unit 17 are implemented by processing circuits mounted on devices on which they are mounted. These processing circuits may each be a processing circuit including a processor, dedicated hardware, or a combination of a processing circuit including a processor and dedicated hardware, like the processing circuit described above.

In the first embodiment, a machine tool that performs milling by rotation of a tool has been described. The present invention is also applicable to a machine tool that performs turning by rotation of a workpiece.

Second Embodiment

Figure 10:
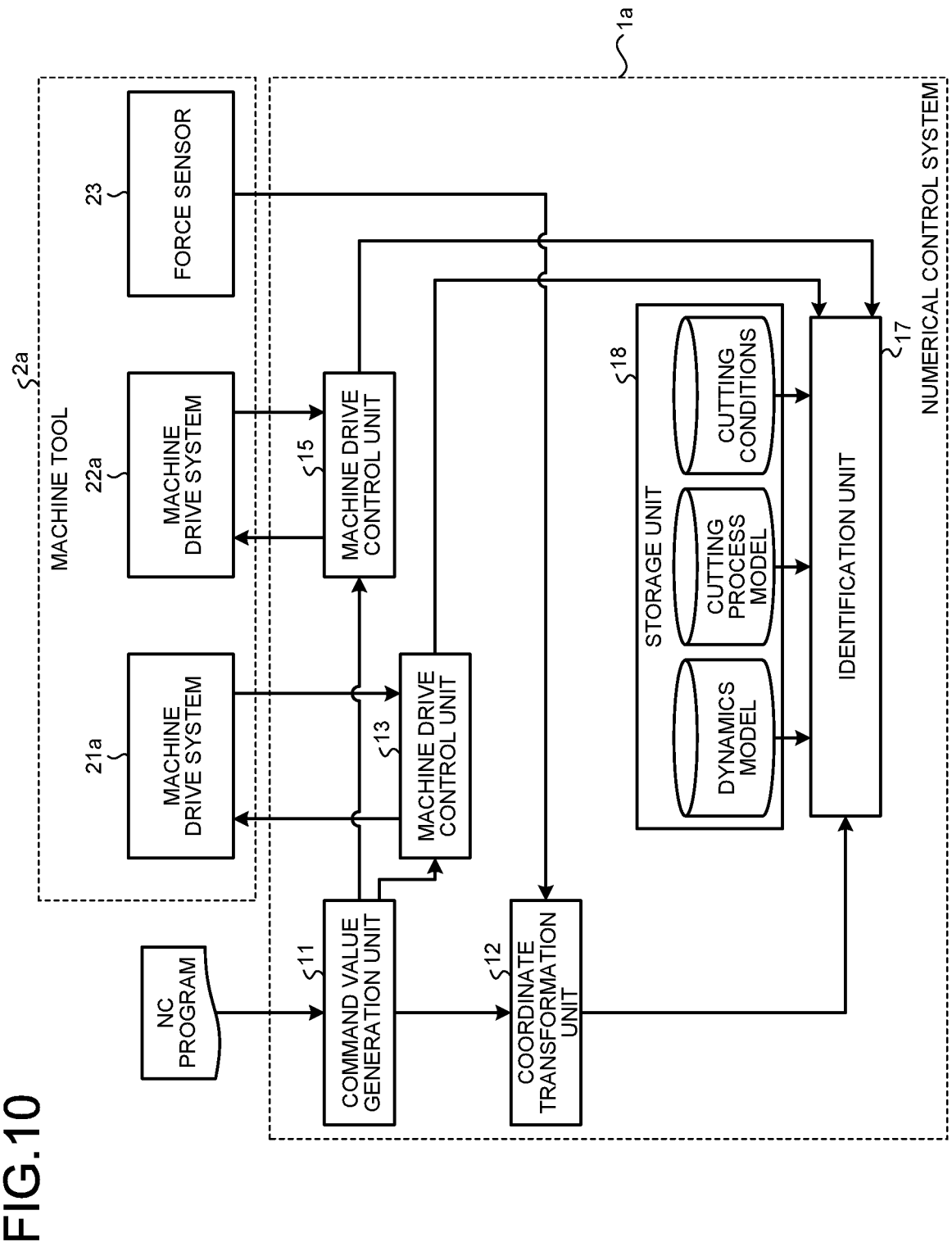
FIG. 10 is a diagram illustrating a configuration example of a numerical control system according to a second embodiment.

FIG. 10 is a diagram illustrating a configuration example of a numerical control system 1a according to a second embodiment of the present invention. The numerical control system 1a of the second embodiment controls a machine tool 2a.

The machine tool 2a includes a machine drive system 21a as a feed drive system and a machine drive system 22a as a spindle drive system. The machine drive system 21a and the machine drive system 22a are the same as the machine drive system 21 and the machine drive system 22 of the first embodiment, respectively, except that each is not provided with an acceleration sensor. A force sensor 23 is provided to the machine tool 2a. The force sensor 23 is installed, for example, on the table 31 or inside the table 31 illustrated in FIG. 4. The installation location of the force sensor 23 is not limited to this example. The force sensor 23 may be installed in any location in which it can detect forces applied to the machine drive systems. The force sensor 23 is an example of a sensor that detects forces or torques applied to the machine drive systems 21a and 22a.

In the first embodiment, disturbance forces are estimated using results detected by acceleration sensors, encoder signals, and motor current signals. In the second embodiment, using the force sensor 23 eliminates the need to provide the disturbance estimation units 14 and 16 to the numerical control system 1a. The numerical control system 1a of the second embodiment is configured by removing the disturbance estimation units 14 and 16 from the numerical control system 1 of the first embodiment, and results of detection by the force sensor 23 are input to the coordinate transformation unit 12. The same reference numerals as those in the first embodiment are assigned to components having the same functions as those of the first embodiment without duplicated explanations. Hereinafter, differences from the first embodiment will be described.

The coordinate transformation unit 12 performs coordinate transformation as in the first embodiment, using results of detection by the force sensor 23 instead of a disturbance force acting on the feed drive system and a disturbance force acting on the spindle drive system input from the disturbance estimation units 14 and 16, respectively, and outputs a coordinate-transformed disturbance force to the identification unit 17 like the estimated disturbance force in the first embodiment. That is, in the second embodiment, the coordinate transformation unit 12 acquires disturbance forces from detection results detected by a sensor that detects forces or torques applied to the machine drive systems 21a and 22a. When this sensor is a sensor detecting torques, the coordinate transformation unit 12 performs coordinate transformation after converting the torques into forces. The identification unit 17 calculates the dynamic characteristic parameters and the cutting process parameters as in the first embodiment. The operation of the numerical control system 1a other than that described above is the same as the operation of the numerical control system 1 of the first embodiment. The coordinate transformation unit 12 may coordinate-transform a detected torque and output it to the identification unit 17, and the identification unit 17 may calculate the dynamic characteristic parameters and the cutting process parameters using the coordinate-transformed torque.

As described above, in the second embodiment, using the force sensor 23 without using the acceleration sensors and the disturbance estimation units 14 and 16, the dynamic characteristic parameters and the cutting process parameters can be calculated as in the first embodiment. Thus, the second embodiment has the same effects as the first embodiment.

Third Embodiment

Figure 11:
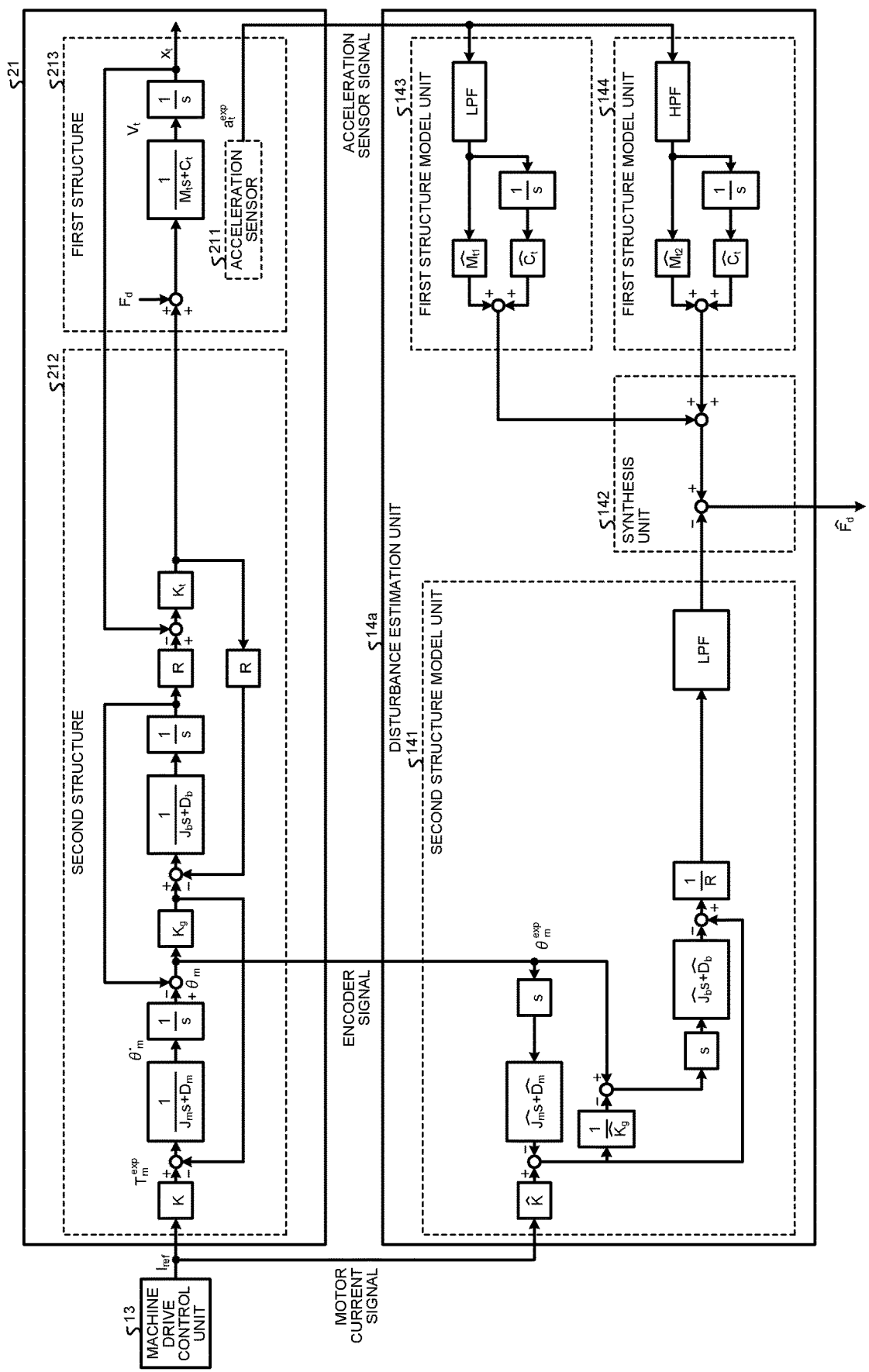
FIG. 11 is a block diagram illustrating a configuration example of a disturbance estimation unit in a third embodiment.

FIG. 11 is a block diagram illustrating a configuration example of a disturbance estimation unit according to a third embodiment of the present invention. A numerical control system of the third embodiment is the same as the numerical control system 1 of the first embodiment except that it includes a disturbance estimation unit 14a instead of the disturbance estimation unit 14 of the first embodiment. Hereinafter, differences from the first embodiment will be described.

The disturbance estimation unit 14 of the first embodiment acquires a machine drive system signal and an acceleration sensor signal from the machine drive system 21 modeled as a single inertia system, to calculate a disturbance force in a high-frequency band that cannot be estimated only with the signal within machine drive system, with the aid of the acceleration sensor. A machine drive system of a machine tool is generally formed as a structure having a plurality of inertias such as a motor, a ball screw, and a table.

Figure 12:
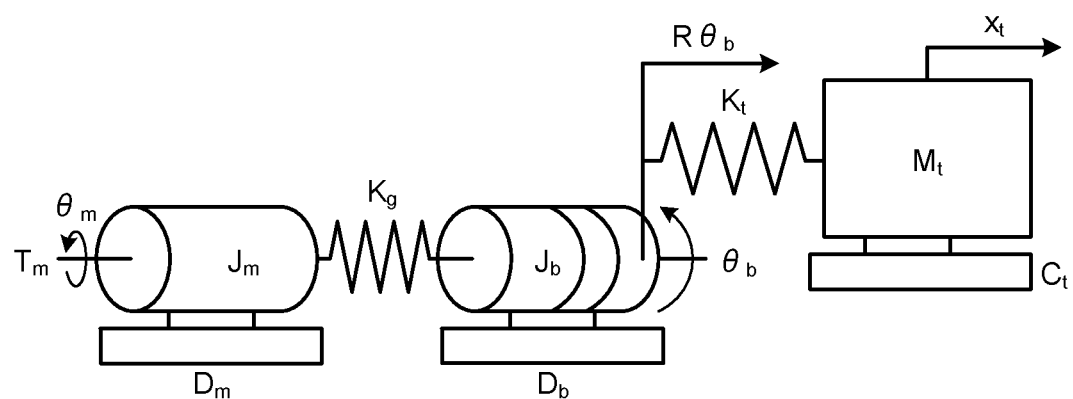
FIG. 12 illustrates an example of a machine drive system model in the third embodiment.

FIG. 12 is a diagram illustrating an example of a model of the machine drive system 21. FIG. 12 illustrates an example of a model of the machine drive system 21 modeled as a three-inertia system corresponding to a motor as a servomotor, a ball screw, and a table when the machine drive system 21 includes the servomotor, the ball screw, and the table. $T_m$ denotes a motor torque, $\theta_m$ denotes a motor angle, $J_m$ and $J_b$ denote inertias, $M_t$ denotes a mass, $D_m$, $D_b$, and $C_t$ denote damping coefficients, $K_g$ and $K_t$ denote spring constants, R denotes a ball screw pitch, and $x_t$ denotes a position. Here, m, b, and t are subscripts indicating the motor, the ball screw, and the table, respectively.

Because the machine drive system 21 generally has a structure having a plurality of inertias as described above, it is desirable to divide the structure into a plurality of segments for modeling to accurately model the behavior of the structure. Therefore, the disturbance estimation unit 14a of the third embodiment divides the structure into a plurality of segments for modeling, divides an acceleration sensor signal output from the acceleration sensor 211 according to frequency bands, and estimates a disturbance force using inverse models according to the bands.

Here, as illustrated in FIG. 11, the machine drive system 21 is divided into a first structure 213 and a second structure 212 for modeling. That is, the machine drive system 21 includes the first structure 213 and the second structure 212 including the motor. The disturbance estimation unit 14a calculates an actual power of machine drive system that is the resultant of forces applied to the first structure 213, based on a plurality of first structure models of the first structure 213 and the acceleration sensor signal. The disturbance estimation unit 14a also calculates a power command of machine drive system that is a force applied by the motor to the machine drive system, based on a second structure model of the second structure 212, a detection result of a motor current flowing through the motor, and a detection result of the position of the motor. Then, the disturbance estimation unit 14a estimates a disturbance force using the actual power of machine drive system and the command power of machine drive system. The plurality of first structure models have different frequency characteristics determined according to the divided frequency bands.

In the machine drive system 21 in FIG. 11, equivalent models of the first structure 213 and the second structure 212 are illustrated. $I_{ref}$ denotes a motor current, K denotes a torque constant, $v_t$ denotes a table velocity, and $F_d$ denotes a disturbance force. $a_t^{exp}$ is an acceleration sensor signal output from the acceleration sensor 211. The subscript ref indicates that it is a reference value calculated by the machine drive control unit 13, and the superscript exp indicates that it is a signal directly detected by the acceleration sensor. The other characters have the same definitions as those in FIG. 12. The first structure is provided with the acceleration sensor 211. Here, the first structure is, for example, the table, and the second structure 212 is, for example, a mechanical structure in which the servomotor and the ball screw are combined. To the machine drive system 21, a disturbance force is applied from the outside to the first structure 213. Further, a command power of machine drive system resulting from a torque output of the servomotor is applied to the first structure 213, so that the position of the first structure 213 is indirectly controlled by the machine drive control unit 13.

The disturbance estimation unit 14a illustrated in FIG. 11 estimates a disturbance force applied to the machine drive system 21 as an estimated disturbance force acting on the feed drive system, based on an encoder signal and a motor current signal output from the machine drive system 21 and an acceleration sensor signal output from the acceleration sensor 211.

Specifically, the disturbance estimation unit 14a includes first structure model units 143 and 144 corresponding to the first structure 213, a second structure model unit 141 corresponding to the second structure, and a synthesis unit 142. In the disturbance estimation unit 14a in FIG. 11, inverse models of the corresponding structures of the units are illustrated. LPF indicates a low-pass filter, and HPF indicates a high-pass filter. Characters with a hat above indicate estimated values.

The first structure model unit 143 and the first structure model unit 144 each calculate an actual power of machine drive system that is a force applied to the first structure 213, based on the acceleration sensor signal. The first structure model unit 143 includes the low-pass filter, and the first structure model unit 144 includes the high-pass filter. These filters serve to separate the acceleration sensor signal into a first frequency band and a second frequency band at a predetermined cutoff frequency. Here, the cut-off frequency of the low-pass filter and the high-pass filter is a frequency upper limit at which the machine drive control unit 13 can control the machine drive system 21, for example. The acceleration sensor signal separated into the two bands passes through the first structure model unit 143 and the first structure model unit 144, so that the first structure model unit 143 outputs a first actual power of machine drive system that is an actual power of machine drive system on the low frequency side, and the first structure model unit 144 outputs a second actual power of machine drive system that is an actual power of machine drive system on the high frequency side.

The second structure model unit 141 calculates a command power of machine drive system that is a drive force for the motor to operate the machine drive system 21, using the motor current signal and the encoder signal. The synthesis unit 142 calculates the sum of the first actual power of machine drive system and the second actual power of machine drive system, and subtracts the command power of machine drive system from the calculated sum, thereby being able to estimate a disturbance force $F_d$ applied to the machine drive system 21.

In the example illustrated in FIG. 11, the machine drive system 21 is expressed as a model composed of three inertias, spring elements that couple the inertias, and damper elements that represent viscous friction. The model of the machine drive system 21 is not limited to this. The machine drive system 21 may be expressed as a model that takes dead time due to communication of the encoder or the acceleration sensor and Coulomb friction into account. In this case, two first structure model units and a single second structure model unit corresponding to them may be included in the disturbance estimation unit 14a.

Parameters included in the inverse models used by the disturbance estimation unit 14a can be calculated by a method described below. For example, the machine drive control unit 13 provides an impulse excitation command, a random excitation command, or a sine sweep excitation command to the motor of the machine drive system 21. The parameters can be fitted based on frequency response obtained from an encoder signal and an acceleration sensor signal at this time. As another example, instead of using the servomotor as an excitation source, the feed drive system may be excited from the outside using an impulse hammer, to fit parameters. As still another example, test machining that produces a disturbance force known in advance may be performed, and the parameters may be fitted using a motor current signal, an encoder signal, and an acceleration sensor signal output at this time. As still another example, the parameters may be calculated using finite element analysis. Further, the parameters may be determined by a combination of those described above.

Figure 13:
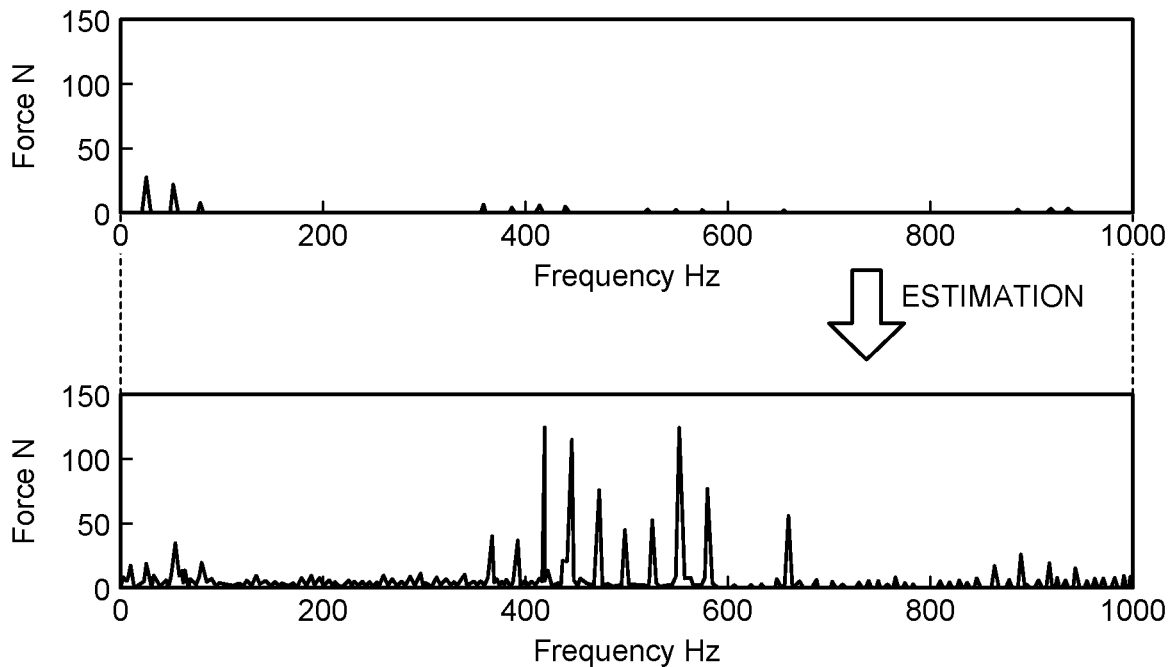
FIG. 13 is a diagram illustrating disturbance force estimation results in a comparative example.

Here, the effects of the third embodiment will be described. FIG. 13 is a diagram illustrating disturbance force estimation results in a comparative example. In the comparative example whose estimation results are illustrated in FIG. 13, as in the technique according to the third embodiment, the state quantity of the motor and the ball screw, i.e. the first structure is estimated using the motor current signal and the encoder signal, the state quantity of the table is estimated using the acceleration sensor signal, and the disturbance is estimated using these estimation results. The difference between the third embodiment and the comparative example is that the comparative example does not include a plurality of first structure model units as in FIG. 11, but includes a single first structure model unit. That is, in the technique of the comparative example, the mass of the table provided with the acceleration sensor is not decomposed according to frequency bands. In an upper row of FIG. 13, an actual disturbance force, that is, a disturbance force actually measured using a force sensor is illustrated, and in a lower row of FIG. 13, results estimated by the comparative example are illustrated. As can be seen from FIG. 13, in the comparative example, estimate values do not coincide with values actually measured by the force sensor in a high frequency band. That is, the technique of the comparative example, which does not decompose the mass of the table provided with the acceleration sensor according to frequency bands for a multi-inertia drive system typified by a ball screw drive, cannot accurately estimate the disturbance force.

Figure 14:
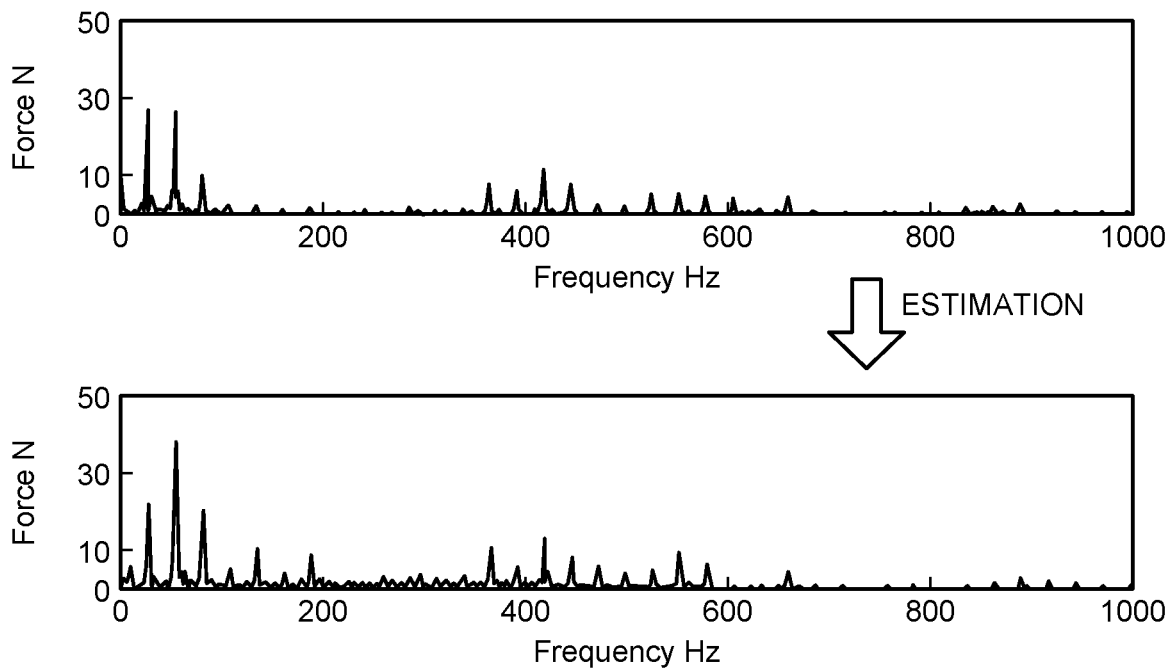
FIG. 14 is a diagram illustrating an example of a disturbance force estimated by the disturbance estimation unit in the third embodiment.

By contrast, in the third embodiment, an acceleration sensor signal is divided according to frequency bands, and different inverse models are provided to the different bands to estimate a disturbance force. FIG. 14 is a diagram illustrating an example of a disturbance force estimated by the disturbance estimation unit 14a of the third embodiment. In an upper row of FIG. 14, an actual disturbance force, that is, a disturbance force actually measured using a force sensor is illustrated, and in a lower row of FIG. 14, results estimated by the disturbance estimation unit 14a of the third embodiment are illustrated. As can be seen from FIG. 14, by using the disturbance estimation unit 14a of the third embodiment, the estimation results equivalent to the results of measurement by the force sensor can be obtained. That is, the disturbance estimation unit 14a of the third embodiment has an advantage of being able to accurately estimate a disturbance force applied to a machine drive system in a machine tool including a multi-inertia drive system typified by a ball screw drive.

In the above description, the acceleration sensor is used as a means for detecting the acceleration of the machine drive system 21, but the physical quantity to be detected is not limited to acceleration. Sensors that directly detect speed such as speed sensors, gyro sensors, or laser Doppler meters may be used. That is, using sensors that can detect a physical quantity obtained by first or higher order time differentiation of the amount of displacement does not depart from the gist of the present invention.

Although in the third embodiment, the ball screw drive machine tool has been described, the disturbance force estimation technique described in the third embodiment is not limited to ball screw drive machine tools. The technique is also applicable to a feed drive system and a spindle drive system driven by a means other than a ball screw as long as they are machine drive systems that can be modeled as a multi-inertia system, that is, machine drive systems composed of a plurality of inertial bodies.

In the third embodiment, the two first structure models are provided in the disturbance estimation unit 14a to divide the frequency band into two bands, but the number of first structure models and the number of filters are not limited to two. For example, three or more first structure models may be provided, and their filters may be designed to divide the frequency band into the same number of bands as the number of first structure models.

In the above description, the example of using the disturbance estimation unit 14a instead of the disturbance estimation unit 14 of the numerical control system 1 of the first embodiment has been described. However, when the motor drive controller 100 illustrated in FIG. 1 is provided singly, the disturbance estimation unit 14a may be used instead of the disturbance estimation unit 14.

Fourth Embodiment

Figure 15:
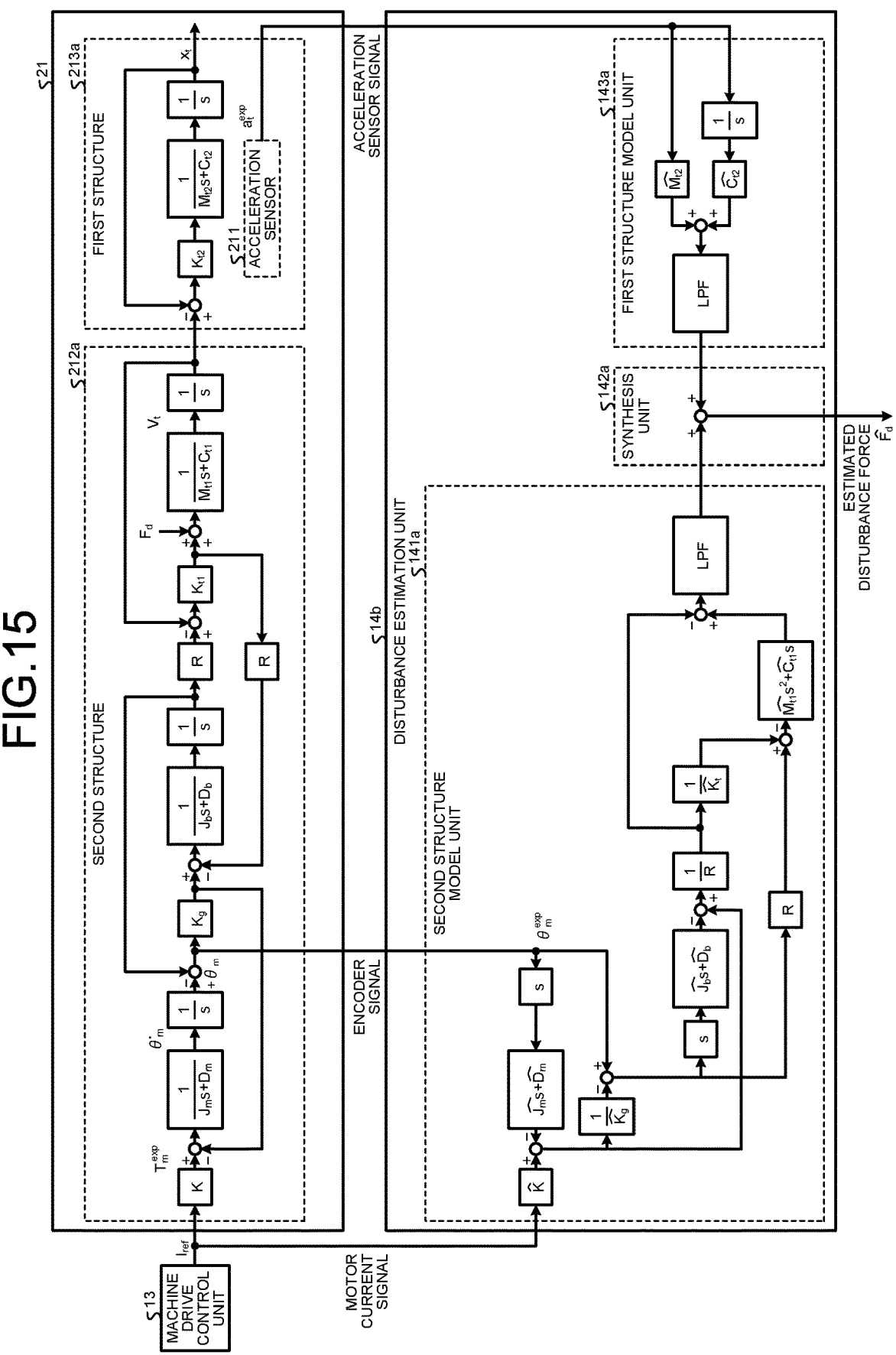
FIG. 15 is a block diagram illustrating a configuration example of a disturbance estimation unit in a fourth embodiment.

FIG. 15 is a block diagram illustrating a configuration example of a disturbance estimation unit according to a fourth embodiment of the present invention. A numerical control system of the fourth embodiment is the same as the numerical control system 1 of the first embodiment except that it includes a disturbance estimation unit 14b instead of the disturbance estimation unit 14 of the first embodiment. Hereinafter, differences from the first embodiment will be described.

Figure 16:
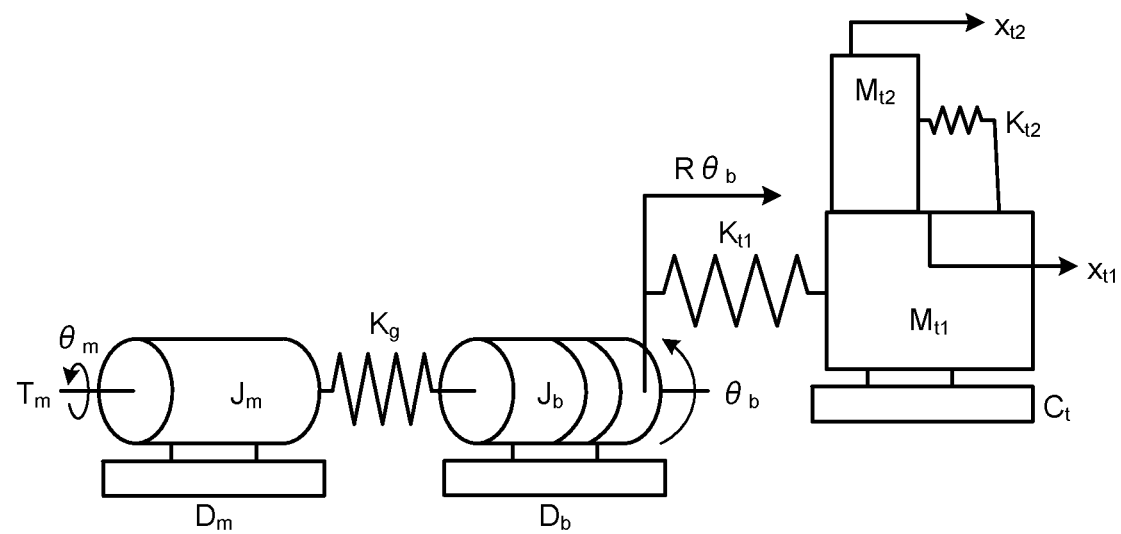
FIG. 16 is a diagram illustrating an example of feed machine drive system modeling in the fourth embodiment.

The disturbance estimation unit 14a of the third embodiment divides an acceleration sensor signal according to frequency bands, and provides different inverse models to the different bands to estimate a disturbance force. The disturbance estimation unit 14b of the fourth embodiment uses a model in which a table provided with an acceleration sensor is divided into a first table inertia that is estimated using an encoder signal and a motor current signal and a second table inertia that is estimated using an acceleration sensor signal, to estimate a disturbance force. FIG. 16 is a diagram illustrating an example of modeling of the machine drive system 21 in the fourth embodiment. Characters in FIG. 16 are the same as those in the third embodiment. Note that those with a subscript including 1 correspond to a first table inertia model, and those with a subscript including 2 correspond to a second table inertia model.

Specifically, the disturbance estimation unit 14b calculates an actual power of machine drive system corresponding to a first structure model of the machine drive system 21 based on the first structure model and the acceleration sensor signal. The disturbance estimation unit 14b also calculates a command power of machine drive system that is a force applied by the motor to the machine drive system 21, based on a second structure model of the machine drive system 21 including the motor of the machine drive system 21, a detection result of a motor current flowing through the motor, and a detection result of the position of the motor. The disturbance estimation unit 14b estimates a disturbance force using the actual power of machine drive system and the command power of machine drive system. One of a plurality of structures constituting the machine drive system is divided into a first inertial body model and a second inertial body model for modeling. The second structure model includes the first inertial body model, and the second structure model includes the second inertial body model. An example of the first inertial body model and the second inertial body model is the first table inertia model and the second table inertia model described above.

The definitions of characters in FIG. 15 are the same as those in the third embodiment. The machine drive system 21 includes a table, a servomotor, and a ball screw as in the third embodiment. In the fourth embodiment, the model of the table is divided into two models which are a first table inertia and a second table inertia, and modeling is performed with a first structure 213a that is regarded as the table, and a second structure 212a that is regarded as a mechanical structure in which the table, the motor, and the ball screw are combined.

The disturbance estimation unit 14b estimates a disturbance force applied to the machine drive system 21 as a disturbance force acting on the feed drive system on the basis of an encoder signal and a motor current signal output from the machine drive system 21, an acceleration sensor signal output from the acceleration sensor 211.

To the machine drive system 21, a disturbance force is applied from the outside to the first structure 213a. Further, a command power of machine drive system resulting from a torque output of the servomotor is applied to the first structure 213a, so that the position of the first structure 213a is indirectly controlled by the machine drive control unit 13.

The disturbance estimation unit 14b includes a first structure model unit 143a corresponding to the first structure 213a, a second structure model unit 141a corresponding to the second structure 212a, and a synthesis unit 142a. The first structure model unit 143a calculates an actual power of machine drive system that is the resultant of forces applied to the first structure 213a, based on the acceleration sensor signal. The first structure model unit 143a includes an LPF for noise reduction.

The second structure model unit 141a calculates a command power of machine drive system that is a drive force for the motor to operate the machine drive system 21, using the motor current signal and the encoder signal. Here, unlike the second structure 212 in the third embodiment, the model of the second structure 212a is a model including the second table inertia that is a division of the inertia of the table. The synthesis unit 142a can estimate a disturbance force $F_d$ applied to the machine drive system by adding up the actual power of machine drive system and the command power of machine drive system.

A method of calculating parameters included in inverse models used in the disturbance estimation unit 14b is the same as the method of calculating the parameters included in the inverse models used in the disturbance estimation unit 14a of the third embodiment.

As described above, the disturbance estimation unit 14b of the fourth embodiment estimates a disturbance force, using the models obtained by dividing the table into the first table inertia that is estimated using the machine drive system signal and the second table inertia that is estimated using the acceleration sensor signal. By thus dividing a structure provided with an acceleration sensor of the structures constituting the machine drive system 21 into two segments for modeling, the same effects as those of the first embodiment can be achieved, and a disturbance force can be accurately estimated.

In the above description, the example of using the disturbance estimation unit 14b instead of the disturbance estimation unit 14 of the numerical control system 1 of the first embodiment has been described. When the motor drive controller 100 illustrated in FIG. 1 is provided singly, the disturbance estimation unit 14b may be used instead of the disturbance estimation unit 14.

Fifth Embodiment

Figure 17:
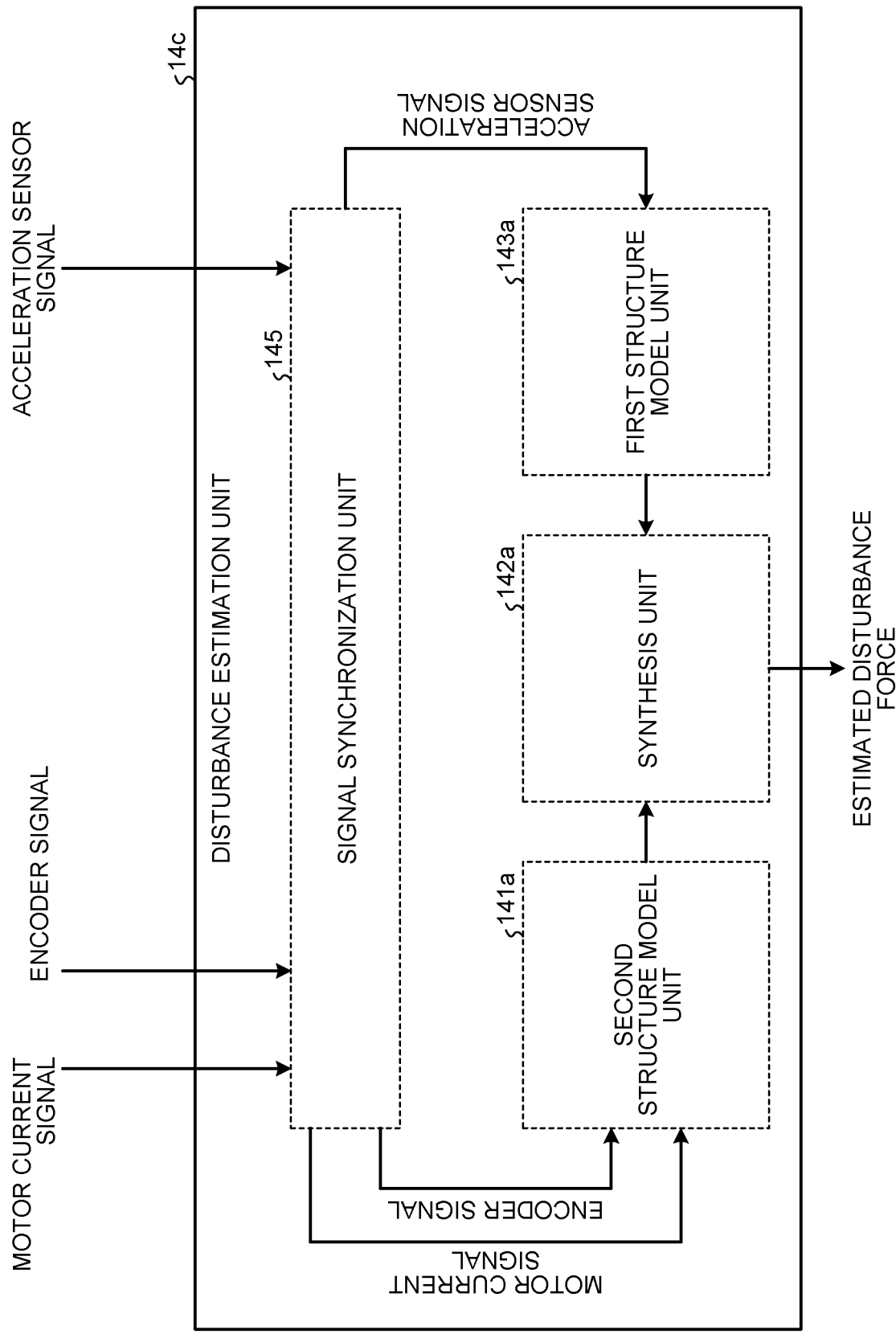
FIG. 17 is a block diagram illustrating a configuration example of a disturbance estimation unit in a fifth embodiment.

FIG. 17 is a block diagram illustrating a configuration example of a disturbance estimation unit according to a fifth embodiment of the present invention. A numerical control system of the fifth embodiment is the same as the numerical control system 1 of the first embodiment except that it includes a disturbance estimation unit 14c instead of the disturbance estimation unit 14 of the first embodiment. Hereinafter, differences from the first embodiment will be described.

The first, third, and fourth embodiments are configured to estimate a disturbance force by the combined use of the encoder signal, the motor current signal, and the acceleration sensor signal. The motor current signal, the encoder signal, and the acceleration sensor signal are signals generated from different signal sources. Thus, the times at which the disturbance estimation unit acquires the signals are not necessarily synchronized, and synchronization errors generally occur. Therefore, as illustrated in FIG. 17, the disturbance estimation unit 14c of the fifth embodiment has a configuration in which a signal synchronization unit 145 is added to the disturbance estimation unit 14b described in the fourth embodiment.

In the signal synchronization unit 145, a first correction time is preset for the encoder signal and a second correction time is preset for the acceleration sensor signal. The first correction time is a time lag of the encoder signal with respect to the motor current signal. The second correction time is a time lag of the acceleration sensor signal with respect to the motor current signal. Further, the signal synchronization unit 145 can record the encoder signal corresponding to the first correction time and the acceleration sensor signal corresponding to the second correction time. When the motor current signal is input at a certain time, the signal synchronization unit 145 outputs the encoder signal at a time different from the certain time by the first correction time and the acceleration sensor signal at a time different from the certain time by the second correction time together with the motor current signal. If sampling rates of the motor current signal, the encoder signal, and the acceleration sensor signal are different from each other, the encoder signal and the acceleration sensor signal at times different from the certain time by the first and second correction times, respectively, can be calculated by time interpolation or extrapolation. As described above, the disturbance estimation unit 14c corrects the time lags produced between the motor current signal, the encoder signal, and the acceleration sensor signal, and estimates the disturbance force using the signals corrected in the time lags. Here, a method of synchronizing the times of the encoder signal and the acceleration sensor signal with the motor current signal has been described. Alternatively, the signals may be synchronized with respect to one of the encoder signal and the acceleration sensor signal. Alternatively, a reference trigger signal for synchronization may be generated in the signal synchronization unit 145, and the signals may be synchronized based on the reference trigger signal.

As described above, the disturbance estimation unit 14c of the fifth embodiment is provided with the signal synchronization unit 145 to correct time synchronization errors between the signals, and thus can reduce time synchronization errors and can accurately estimate the disturbance force.

In the example described above, the signal synchronization unit 145 is added to the disturbance estimation unit 14b of the fourth embodiment. Likewise, by adding the signal synchronization unit 145 to the disturbance estimation unit 14 of the first embodiment and the disturbance estimation unit 14a of the third embodiment, time synchronization errors can be corrected likewise.

Sixth Embodiment

Figure 18:
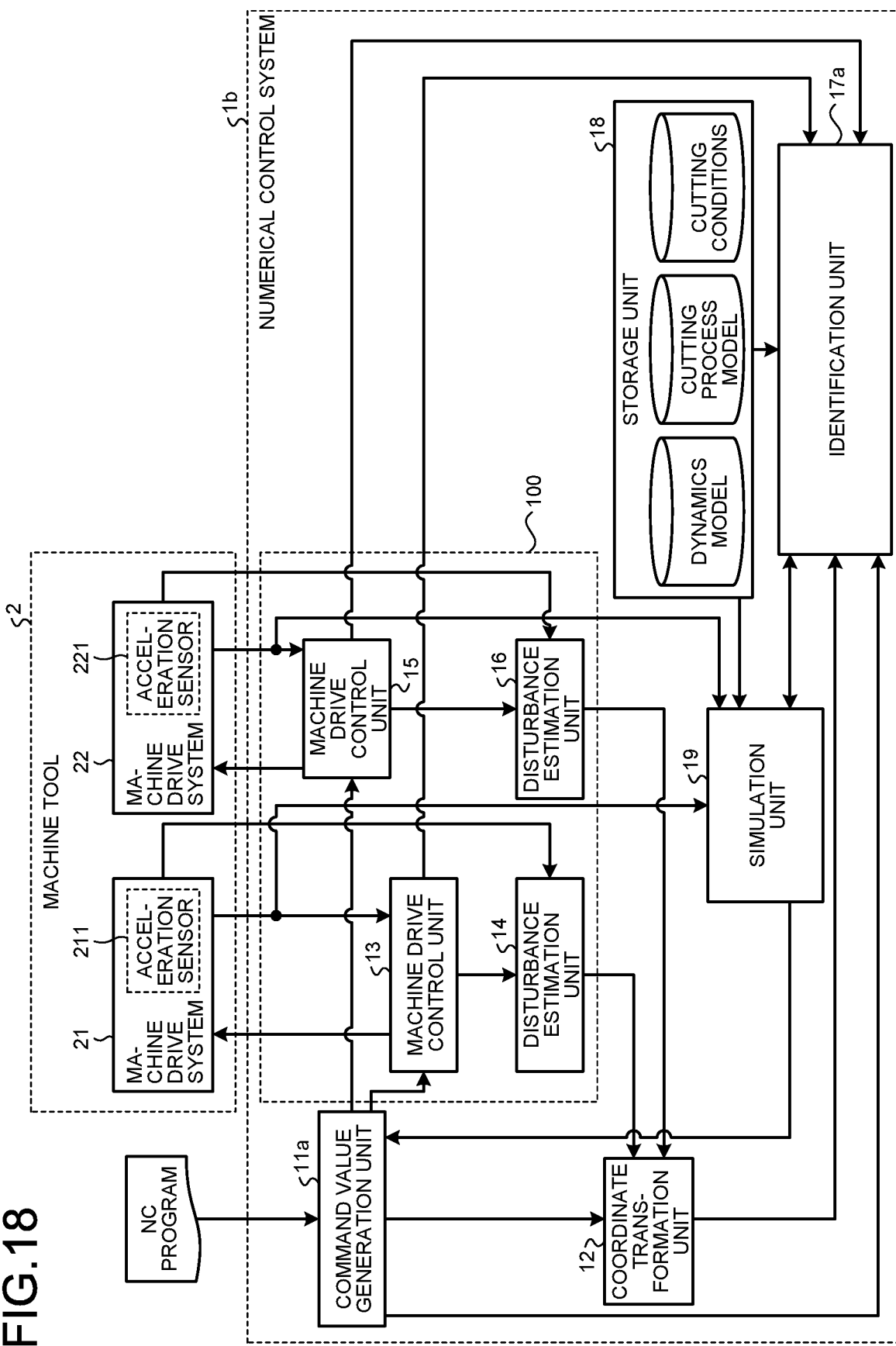
FIG. 18 is a block diagram illustrating a configuration example of a numerical control system according to a sixth embodiment.

FIG. 18 is a block diagram illustrating a configuration example of a numerical control system according to a sixth embodiment of the present invention. In a numerical control system 1b of the sixth embodiment, a simulation unit 19 is added to the numerical control system 1 of the first embodiment, and a command value generation unit 11a and an identification unit 17a are provided in place of the command value generation unit 11 and the identification unit 17. Except for these, the numerical control system 1b of the sixth embodiment is the same as the numerical control system 1 of the first embodiment. The same reference numerals as those in the first embodiment are assigned to components having the same functions as those of the first embodiment without duplicated explanations. Hereinafter, differences from the first embodiment will be mainly described.

In the sixth embodiment, in the NC program, an identification command is described in addition to the relative tool position command or the feed drive system position command in the NC program coordinate system, the spindle drive system rotation command, and the feed rate command. Here, the identification command is a command for causing the identification unit 17a to start identification processing on the dynamic characteristic parameters and the cutting process parameters.

The command value generation unit 11a analyzes commands described in the NC program, generates machine drive system commands for the machine drive systems 21 and 22 as in the first embodiment, and outputs them to the corresponding machine drive control units 13 and 15. When the analyzed commands include the identification command, the command value generation unit 11a outputs the identification command to the identification unit 17a. That is, when the NC program includes a command that instructs execution of identification by the identification unit 17a, the command value generation unit 11a instructs the identification unit 17a to calculate the cutting process parameters and the dynamic characteristic parameters. Further, the command value generation unit 11a corrects the machine drive system commands according to simulation results of the mechanical dynamics and the cutting process described below output from the simulation unit 19.

When the identification command output from the command value generation unit 11a is input, the identification unit 17a calculates the dynamic characteristic parameters and the cutting process parameters by the same method as the method described in the first embodiment, and outputs the calculated results to the simulation unit 19. Further, the identification unit 17a compares an estimated disturbance force output by the coordinate transformation unit 12 with a simulated disturbance force output by the simulation unit 19. Here, the estimated disturbance force is a cutting force calculated by the disturbance estimation units and coordinate-transformed by the coordinate transformation unit, and the simulated disturbance force is a cutting force calculated by the simulation unit 19. If the difference between the estimated disturbance force and the simulated disturbance force is larger than a threshold, the identification unit 17a determines that the machining state has changed, and executes the identification processing again. That is, the identification unit 17a calculates the difference between a disturbance force output from the coordinate transformation unit 12 and a disturbance force simulated by the simulation unit 19. When the difference is larger than the threshold, the identification unit 17a calculates the cutting process parameters and the dynamic characteristic parameters. When the estimated disturbance force and the simulated disturbance force are calculated as vectors, the identification unit 17a can calculate the difference between the estimated disturbance force and the simulated disturbance force by calculating norms for their respective cutting forces and comparing the norms. As another example, the identification unit 17a may calculate the difference between the estimated disturbance force and the simulated disturbance force in a certain direction such as a tool traveling direction, and compare the difference with the threshold.

The simulation unit 19 calculates machine drive system positions based on encoder signals output from the machine drive systems 21 and 22, and simulates vibrations of the structures around the tool and the workpiece and the cutting process between the tool and the workpiece, using the dynamics model, the cutting process model, and the cutting conditions.

Vibrations of the structures around the tool and the workpiece are simulated as follows. Using the dynamics model, the simulation unit 19 calculates, for one or both of the workpiece-side structure and the tool-side structure, relative displacements produced in the structures which are produced when a cutting force acts on them. The simulation unit 19 calculates a position deviation of the tool from the calculated relative displacements in the structures and the positions of the machine drive systems 21 and 22, and calculates disturbance forces applied to the machine drive systems 21 and 22. Here, the position deviation of the tool is the difference between a tool position when no cutting force is produced at the tool and a tool position when a cutting force is produced at the tool.

The cutting process is simulated as follows. The simulation unit 19 calculates a trajectory of a tool tooth edge from the position deviation of the tool with respect to the workpiece and the tool rotation angle, using the cutting conditions and the cutting process model. The simulation unit 19 calculates an uncut chip thickness from the trajectory of the tool tooth edge, and calculates a cutting force corresponding to the uncut chip thickness. The cutting force calculated here is output to the identification unit 17a.

As described above, a cutting force used in the dynamics model is calculated using the cutting process model, and a position deviation of the tool used in the cutting process is calculated using the dynamics model. Thus, by alternately repeating the calculation using the dynamics model and the calculation using the cutting process model, the simulation unit 19 can simultaneously simulate the mechanical dynamics and the cutting process from moment to moment. In other words, the simulation unit 19 can simulate the cutting force produced between the tool and the workpiece, based on the motor current signal, the encoder signal, the cutting conditions, and the cutting process model, and simulate the disturbance forces produced at the machine drive systems and the relative position deviations of the tool and the workpiece when the cutting force is produced, based on the dynamics model.

Here, correction processing executed by the command value generation unit 11a based on the results of simulation of the mechanical dynamics and the cutting process performed by the simulation unit 19 will be described. Using the position deviation of the tool simulated by the simulation unit 19, the command value generation unit 11a adds a movement amount corresponding to the deviation to the machine drive system commands for the feed drive systems. By this correction, dimensional errors caused by the position deviation of the tool can be reduced.

As another correction method, the command value generation unit 11a may compare thicknesses cut by the tool tooth edges simulated by the simulation unit 19, and correct the feedrate per tooth or the feed drive system positions so that the maximum uncut chip thicknesses produced by the tooth edges become equal. By this correction, vibrations of the tool tooth edges caused by changes in uncut chip thickness can be reduced. As another correction method, the command value generation unit 11a may calculate the maximum value or the mean value within a fixed time, using cutting forces simulated by the simulation unit 19, and reduce the feedrate per tooth when the calculation result exceeds a predetermined cutting force upper limit. By this correction, the cutting force can be limited to the cutting force upper limit or lower. Tool breakage due to an excessive cutting force can be avoided.

As still another correction method, the command value generation unit 11a may compare cutting forces produced by the tooth edges during one rotation of the tool, using cutting forces simulated by the simulation unit 19, and correct the feedrate per tooth or the spindle drive system rotation speed so that the maximum values of cutting forces produced by the tooth edges become equal. By this correction, a cutting force applied to a certain tooth edge is reduced, so that cutting forces can be produced equally for the tooth edges.

As still another correction method, the command value generation unit 11a may calculate machined surface roughness from a trajectory of a tool tooth edge simulated by the simulation unit 19, and reduce the feedrate per tooth when the machined surface roughness exceeds a predetermined machined surface roughness upper limit. By this correction, a finished surface with machined surface roughness lower than or equal to the machined surface roughness upper limit is formed. A plurality of processes of the above-described correction processes may be combined.

As described above, the numerical control system 1b of the sixth embodiment identifies the dynamic characteristic parameters and the cutting process parameters at a timing described in the NC program or a timing when it is determined that the machining state has changed, and further simulates the mechanical dynamics and the cutting process, and corrects by the command value generation unit the machine drive system commands based on the simulation results. Thus, the following effects are achieved.

Because the identification unit 17a executes processing upon reception of the identification command, the numerical control system 1b can identify the dynamic characteristic parameters and the cutting process parameters at a timing specified by the NC program. Therefore, even if the machining state changes during the same NC program, the dynamic characteristic parameters and the cutting process parameters can be identified at a timing described in the NC program.

Further, the identification unit 17a compares an estimated disturbance force with a simulated disturbance force, so that the dynamic characteristic parameters and the cutting process parameters that determine the characteristics of the dynamics model and the cutting process model can be verified. Therefore, when the mechanical dynamics or the cutting process has changed, the identification processing can be executed so that the simulation unit can correctly simulate the disturbance force compared to the estimated disturbance force. Furthermore, the simulation unit 19 simulates the mechanical dynamics and the cutting process, so that the cutting process can be changed in real time.

Thus, the numerical control system 1b described in the sixth embodiment can execute the identification processing at a timing not specified in the NC program when the mechanical dynamics or the cutting process has changed, in addition to the timing specified in the NC program. By executing a simulation using the dynamics model and the cutting process model whose characteristics have been determined by the dynamic characteristic parameters and the cutting process parameters obtained from the identification processing, the command value generation unit can make corrections based on the simulation results to the machine drive systems.

Figure 19:
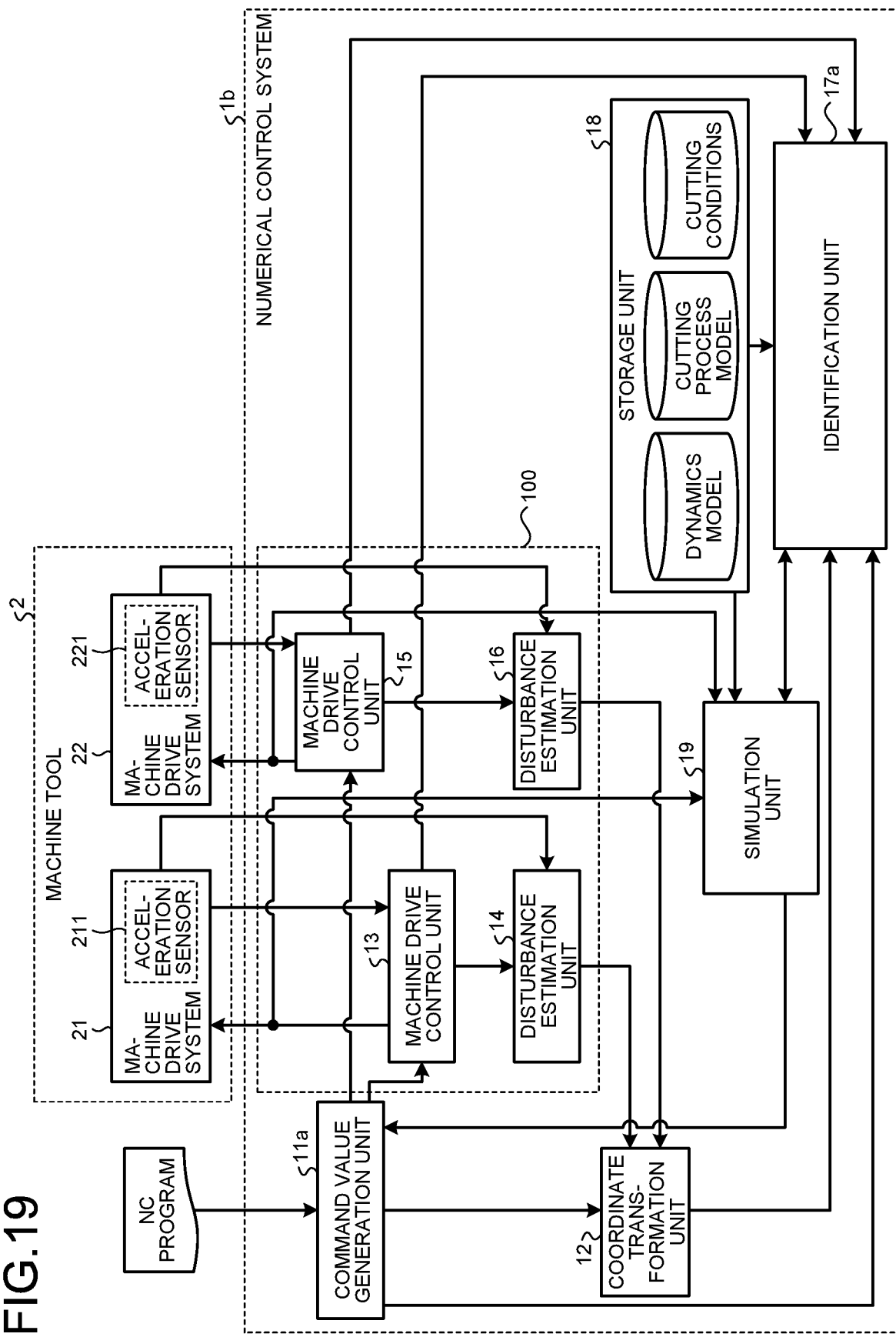
FIG. 19 is a block diagram illustrating another configuration example of the numerical control system according to the sixth embodiment.

FIG. 19 is a block diagram illustrating another configuration example of the numerical control system of the sixth embodiment. In the example illustrated in FIG. 18, feedback positions indicated by encoder signals that can be acquired from the machine drive systems 21 and 22 are input to the simulation unit 19. In the configuration example illustrated in FIG. 19, instead of the feedback positions, command positions generated in the machine drive control units 13 and 15 are input to the simulation unit 19. The simulation unit 19 performs a simulation like the simulation unit 19 in the configuration example illustrated in FIG. 18, using the command positions generated in the machine drive control units 13 and 15, instead of the feedback positions. The operation in the configuration example illustrated in FIG. 19 is the same as the operation in the configuration example illustrated in FIG. 18 except for the point described above. In FIG. 19, the same reference numerals are assigned to components having the functions illustrated in FIG. 18. The configuration illustrated in FIG. 19 can achieve effects equivalent to those of the numerical control system 1b illustrated in FIG. 18.

Seventh Embodiment

Figure 20:
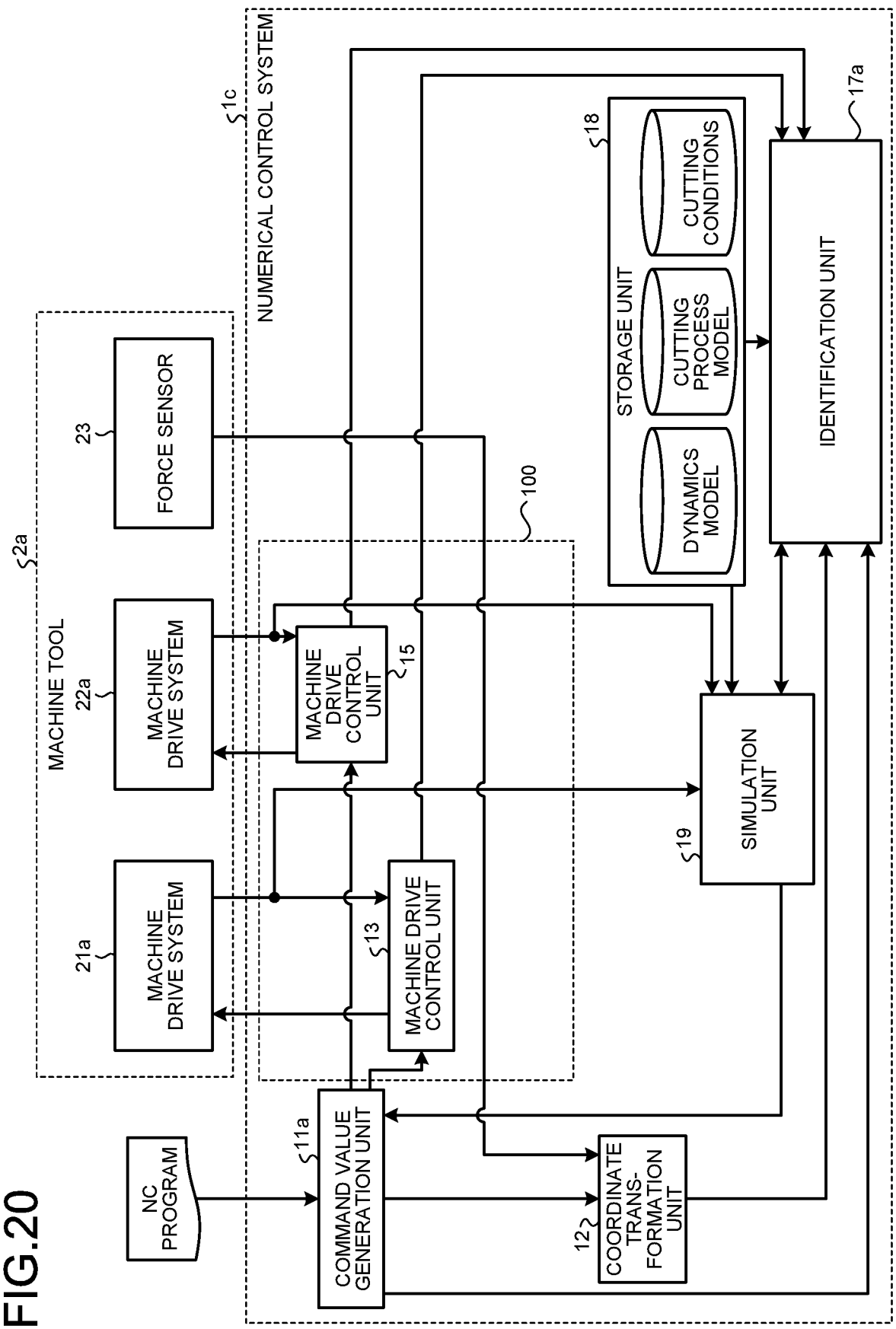
FIG. 20 is a block diagram illustrating a configuration example of a numerical control system according to a seventh embodiment.

FIG. 20 is a block diagram illustrating a configuration example of a numerical control system according to a seventh embodiment of the present invention. A numerical control system 1c of the seventh embodiment is configured by adding a simulation unit 19 to the numerical control system 1a of the second embodiment. Except for these, the numerical control system 1c of the seventh embodiment is the same as the numerical control system 1a of the second embodiment. The same reference numerals as those in the second embodiment are assigned to components having the same functions as those of the second and sixth embodiments without duplicated explanations.

Thus, in the seventh embodiment, the dynamic characteristic parameters and the cutting process parameters are calculated as in the first embodiment, using the force sensor 23 without using the acceleration sensors and the disturbance estimation units 14 and 16. Further, the dynamic characteristic parameters and the cutting process parameters are identified at a timing described in the NC program or a timing when it is determined that the machining state has changed. Furthermore, the mechanical dynamics and the cutting process are simulated, and the command value generation unit corrects machine drive system commands based on the simulation results. Thus, the seventh embodiment has the same effects as the sixth embodiment.

Figure 21:
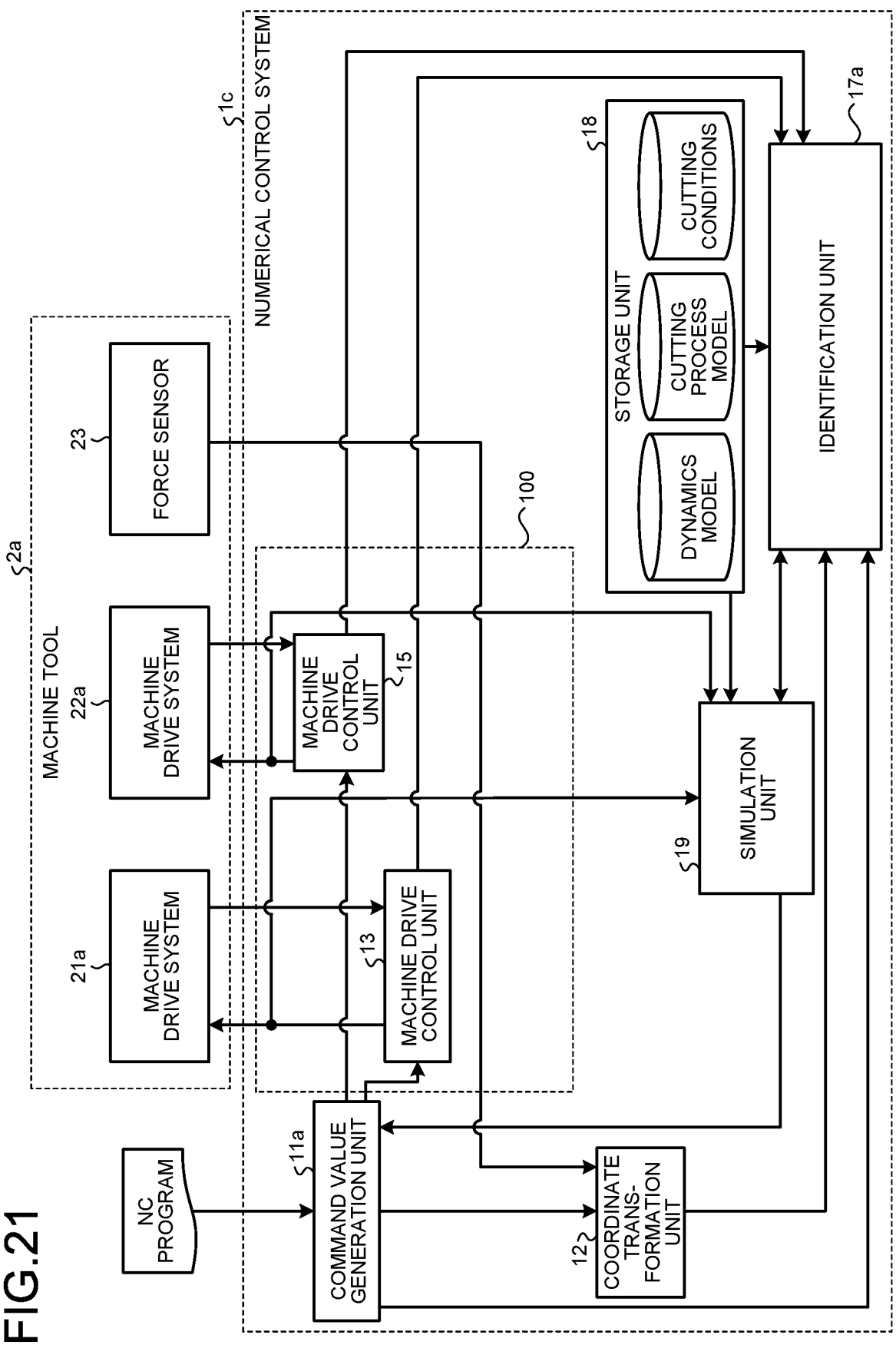
FIG. 21 is a block diagram illustrating another configuration example of the numerical control system according to the seventh embodiment.

FIG. 21 is a block diagram illustrating another configuration example of the numerical control system of the seventh embodiment. In the example illustrated in FIG. 20, feedback positions indicated by encoder signals that can be acquired from the machine drive systems 21a and 22a are input to the simulation unit 19. In the configuration example illustrated in FIG. 21, instead of the feedback positions, command positions generated in the machine drive control units 13 and 15 are input to the simulation unit 19. The simulation unit 19 performs a simulation like the simulation unit 19 in the configuration example illustrated in FIG. 20, using the command positions generated in the machine drive control units 13 and 15, instead of the feedback positions. The operation in the configuration example illustrated in FIG. 21 is the same as the operation in the configuration example illustrated in FIG. 20 except for the point described above. In FIG. 21, the same reference numerals are assigned to components having the functions illustrated in FIG. 20. The configuration illustrated in FIG. 21 can achieve effects equivalent to those of the numerical control system 1c illustrated in FIG. 20.

The configurations described in the above embodiments illustrate an example of the subject matter of the present invention, and can be combined with another known art, and can be partly omitted or changed without departing from the scope of the present invention.

REFERENCE SIGNS LIST 1, 1a, 1b, 1c numerical control system; 2, 2a machine tool; 11, 11a command value generation unit; 12 coordinate transformation unit; 13, 15 machine drive control unit; 14, 14a, 14b, 14c, 16 disturbance estimation unit; 17, 17a identification unit; 18 storage unit; 21, 21a, 22, 22a machine drive system; 23 force sensor; 31 table; 32 workpiece; 33 tool; 100 motor drive controller; 211, 221 acceleration sensor.

The invention claimed is:

1. A numerical control system that controls machine drive systems included in a machine tool that performs machining using a tool, according to a numerical control program, the system comprising:
processing circuitry
to acquire a disturbance force or a disturbance torque applied to each of the machine drive systems, and coordinate-transform the disturbance force or the disturbance torque into a tool reference coordinate system for output; and
to calculate cutting process parameters that determine characteristics of a cutting process model and dynamic characteristic parameters that determine characteristics of a dynamics model of the machine tool, using the disturbance force or the disturbance torque output, states of the machine drive systems, predetermined equation models, and cutting conditions, wherein
the equation models define relationships between the cutting process parameters, the dynamic characteristic parameters, and the disturbance force or the disturbance torque, and
the processing circuitry is further configured to correct commands of the numerical control program based on a simulation of the dynamics model and the cutting process model.

2. The numerical control system according to claim 1, wherein the processing circuitry acquires the disturbance force or the disturbance torque from a detection result detected by a sensor to detect a disturbance force or a disturbance torque applied to each of the machine drive systems.

3. The numerical control system according to claim 1, wherein the processing circuitry further estimates the disturbance force or the disturbance torque applied to each of the machine drive systems, using a detection result detected by one or more sensors each of which to detect velocity or acceleration of corresponding one of the machine drive systems, wherein
the processing circuitry acquires the disturbance force or the disturbance torque.

4. The numerical control system according to claim 1, wherein when the disturbance forces or the disturbance torques acquired include components in the same direction on tool reference coordinates, the processing circuitry selects a combination in which directions are independent from each other from the disturbance forces or the disturbance torques acquired.

5. The numerical control system according to claim 3, wherein one of the machine drive systems includes a first structure and a second structure including a motor,
the processing circuitry calculates an actual power of machine drive system that is a resultant of forces applied to the first structure, based on a plurality of first structure models of the first structure and the detection result, calculates a command power of machine drive system that is a force applied by the motor to the one of the machine drive systems, based on a second structure model of the second structure, a detection result of a motor current flowing through the motor, and a detection result of a position of the motor, and estimates the disturbance force or the disturbance torque using actual power of machine drive system and the power command of machine drive system, and
the plurality of first structure models have different frequency characteristics determined according to a plurality of divided frequency bands.

6. The numerical control system according to claim 3, wherein
one of the machine drive systems includes a first structure and a second structure including a motor,
the processing circuitry calculates an actual power of machine drive system that is a resultant of forces applied to the first structure, based on a first structure model of the first structure and the detection result, calculates a power command of machine drive system that is a force applied by the motor to the one of the machine drive systems, based on a second structure model of the machine drive system including the motor of the machine drive system, a detection result of a motor current flowing through the motor, and a detection result of a position of the motor, and estimates the disturbance force or the disturbance torque using the actual power of machine drive system and the power command of machine drive system, and
one of the structures constituting the one of the machine drive systems is divided into a first inertial body model and a second inertial body model for modeling, the first structure model includes the first inertial body model, and the second structure model includes the second inertial body model.

7. The numerical control system according to claim 5, wherein the processing circuitry corrects time lags produced between a signal indicating the detection result of the motor current, a signal indicating the detection result of the position of the motor, and a signal indicating the detection result of the sensor, and estimates the disturbance force or the disturbance torque, using the signals corrected in the time lags.

8. The numerical control system according to claim 1, wherein
one of the machine drive systems includes a first structure and a second structure including a motor,
the numerical control system further includes a function to simulate a cutting force produced between the tool and a workpiece machined by the tool, based on a detection result of a motor current flowing through the motor, a detection result of a position of the motor, the cutting conditions, and the cutting process model, and simulate a disturbance force or a disturbance torque produced at each of the machine drive systems and a relative position deviation between the tool and the workpiece when a cutting force is produced, based on the dynamics model.

9. The numerical control system according to claim 8, wherein the processing circuitry calculates a difference between the disturbance force output and the disturbance force simulated, or a difference between the disturbance torque output and the disturbance torque simulated, and calculates the cutting process parameters and the dynamic characteristic parameters when the calculated difference is larger than a threshold.

10. The numerical control system according to claim 8, wherein the processing circuitry further issues an instruction to execute calculation of the cutting process parameters and the dynamic characteristic parameters when the numerical control program includes a command that instructs execution of identification.

11. The numerical control system according to claim 10, wherein the processing circuitry corrects commands for the machine drive systems according to results simulated.

12. The numerical control system according to claim 1, wherein
- the cutting process model is a mathematical model for calculating an uncut chip thickness based on a tool rotation angle and a relative displacement between a tooth edge of the tool and a workpiece machined by the tool, and calculating a cutting force produced based on the uncut chip thickness between the tool and the workpiece, and
- the dynamics model is a mathematical model for calculating disturbance forces or disturbance torques transmitted to the machine drive systems through mechanical structures including the tool or the workpiece when the cutting force is produced, and calculating position deviations produced at the machine drive systems through the mechanical structures when the cutting force is produced.

13. The numerical control system according to claim 12, wherein the cutting process model is a model in which the uncut chip thickness is calculated based on a difference between a trajectory formed by a tooth edge of the tool involved in cutting and a previous machined surface formed by a tooth edge one or more teeth before the tooth edge involved in cutting.

14. The numerical control system according to claim 12, wherein the cutting process model is a model in which a correction amount corresponding to a number indicating the tooth edge of the tool and a rotation angle of the tool, is added to or subtracted from the uncut chip thickness.

15. The numerical control system according to claim 12, wherein the cutting process model is a model in which it is determined whether the tooth edge contacts the workpiece based on the position deviation at each rotation angle of the tool or time, and when the tooth edge contacts the workpiece, the uncut chip thickness is calculated, and when the tooth edge does not contact the workpiece, the uncut chip thickness is calculated to zero.

16. The numerical control system according to claim 6, wherein the processing circuitry corrects time lags produced between a signal indicating the detection result of the motor current, a signal indicating the detection result of the position of the motor, and a signal indicating the detection result of the sensor, and estimates the disturbance force or the disturbance torque, using the signals corrected in the time lags.

* * * * *